United States Patent
Mathiesen et al.

(10) Patent No.: US 10,932,103 B1
(45) Date of Patent: Feb. 23, 2021

(54) DETERMINING POSITION OF A USER RELATIVE TO A TOTE

(71) Applicant: AMAZON TECHNOLOGIES, INC., Reno, NV (US)

(72) Inventors: Thomas Meilandt Mathiesen, Seattle, WA (US); Benjamin Ralph Hollis, Seattle, WA (US); Sridhar Boyapati, Sammamish, WA (US); Korwin Jon Smith, Seattle, WA (US); Jason Michael Famularo, Seattle, WA (US); Alexander Michael McNamara, Seattle, WA (US); Amber Autrey Taylor, Seattle, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 0 days.

(21) Appl. No.: 14/222,469

(22) Filed: Mar. 21, 2014

(51) Int. Cl.
*G06Q 50/26* (2012.01)
*G06F 17/30* (2006.01)
*H04W 4/40* (2018.01)

(52) U.S. Cl.
CPC ................... *H04W 4/40* (2018.02)

(58) Field of Classification Search
CPC ........... G06F 2200/1614; G06F 1/1626; G06F 3/012; G06F 1/1686; G06F 1/1694; G06F 1/1613; G06F 1/1652; G06F 2200/1637; G06F 3/013; G06F 3/017; G06F 3/0304; G06F 3/0317; G06F 3/0346; G06F 3/0481; G06K 2019/06243; G06K 9/46; G06K 9/4604; G06K 9/4609; G06K 9/6202; G06K 9/00228; G06K 9/00248; G06K 9/3208; G06Q 30/02; G06Q 20/18; G06Q 20/20; G06Q 20/208; G06Q 30/0261; G06Q 30/0267; G06T 7/004; G06T 7/0042; G06T 7/0065; G06T 13/80; G06T 2207/10132; G06T 2207/30104; G06T 7/0012; G09G 2340/0492; G09G 2320/0261;

(Continued)

(56) References Cited

U.S. PATENT DOCUMENTS

| 4,492,963 A | * | 1/1985 | Scarlet | ...................... G01S 5/12 342/464 |
| 4,521,772 A | * | 6/1985 | Lyon | ...................... G06F 3/0317 235/472.01 |

(Continued)

OTHER PUBLICATIONS

Asthana, et al., "An indoor wireless system for personalized shopping assistance", CiteSeerX, In Proceedings of IEEE Workshop on Mobile Computing Systems and Applications, 1994; [retrieved on Jun. 30, 2013], Retrieved from the Internet: <URL:http://citeseerx.ist.psu.edu/viewdoc/summary?doi=10.1.1.127.3033>.

(Continued)

*Primary Examiner* — Fekadeselassie Girma
(74) *Attorney, Agent, or Firm* — Lindauer Law, PLLC

(57) ABSTRACT

Described are systems and techniques configured to determine a tote placement indicative of a position of a user relative to a tote, or vice versa. The determination may be based at least in part on data such as images acquired from cameras onboard the tote, images acquired from cameras external to the tote, proximity sensors onboard the tote, weight sensors, and so forth. Orientation of information presented on a display device of the tote may be based on the tote placement.

22 Claims, 14 Drawing Sheets

(58) Field of Classification Search
CPC ........... G09G 2354/00; G09G 2380/02; G09G 5/006; B65D 2203/12; G01C 21/20; G01C 21/3647; G01G 19/4144; G01G 21/28; G02B 27/06; G02B 3/005; G07G 1/0072; G07G 1/0081; G09F 11/00; G09F 19/14; G09F 21/04; H04N 5/23219; H04N 5/23241; H04N 5/23293
USPC ...................................... 340/539.22; 345/156
See application file for complete search history.

(56) References Cited

U.S. PATENT DOCUMENTS

| | | | | |
|---|---|---|---|---|
| 5,088,645 | A * | 2/1992 | Bell | G05D 23/1902 236/46 R |
| 5,181,638 | A * | 1/1993 | McHale | A45F 3/047 224/259 |
| 5,485,568 | A * | 1/1996 | Venable | G06T 11/60 715/210 |
| 5,917,175 | A * | 6/1999 | Miller | G06F 1/1622 235/383 |
| 5,948,303 | A * | 9/1999 | Larson | G05D 23/1905 126/205 |
| 5,970,162 | A * | 10/1999 | Kawashima | H04N 7/142 348/14.05 |
| 6,088,019 | A | 7/2000 | Rosenberg | |
| 6,141,012 | A * | 10/2000 | Bollman | G06T 11/60 345/418 |
| 6,205,231 | B1 * | 3/2001 | Isadore-Barreca | G06K 9/32 375/E7.081 |
| 6,810,135 | B1 * | 10/2004 | Berenz | G06K 9/00248 280/735 |
| 6,864,912 | B1 * | 3/2005 | Mahaffey | G06F 3/012 348/14.01 |
| 6,892,405 | B1 * | 5/2005 | Dimitriu | A61G 7/001 5/609 |
| 6,903,874 | B1 * | 6/2005 | Karterman | A47G 19/2227 359/619 |
| 7,225,980 | B2 | 6/2007 | Ku et al. | |
| 7,949,568 | B2 | 5/2011 | Fano et al. | |
| 8,009,864 | B2 | 8/2011 | Linaker et al. | |
| 8,060,840 | B2 * | 11/2011 | Billow | G06F 3/0481 715/750 |
| 8,089,340 | B2 * | 1/2012 | Cochran | G07C 9/257 340/5.7 |
| 8,189,855 | B2 | 5/2012 | Opalach et al. | |
| 8,244,068 | B2 * | 8/2012 | Thorn | G06K 9/00248 382/289 |
| 8,363,145 | B2 * | 1/2013 | Iwamoto | H04N 5/23219 348/333.11 |
| 8,611,673 | B2 * | 12/2013 | Aarabi | G06F 16/5854 382/209 |
| 8,630,924 | B2 | 1/2014 | Groenevelt et al. | |
| 8,788,977 | B2 * | 7/2014 | Bezos | G06F 1/1626 715/773 |
| 8,910,843 | B2 * | 12/2014 | Almalki | G01G 19/58 224/576 |
| 9,075,435 | B1 * | 7/2015 | Noble | G06F 3/013 |
| 9,098,905 | B2 * | 8/2015 | Rivlin | G06T 7/004 |
| 9,235,928 | B2 | 1/2016 | Medioni et al. | |
| 10,055,556 | B2 * | 8/2018 | Smith | H04W 12/06 |
| 2001/0028301 | A1 * | 10/2001 | Geiger | B62B 3/1424 340/5.91 |
| 2001/0034240 | A1 * | 10/2001 | Koshima | H04W 60/00 455/457 |
| 2003/0115096 | A1 * | 6/2003 | Reynolds | G06Q 30/02 705/14.58 |
| 2003/0197612 | A1 * | 10/2003 | Tanaka | G06K 17/00 340/572.1 |
| 2004/0017475 | A1 * | 1/2004 | Akers | G06Q 50/22 348/207.1 |
| 2004/0051644 | A1 * | 3/2004 | Tamayama | G08B 13/19691 340/686.1 |
| 2004/0078227 | A1 * | 4/2004 | Morris | G16H 10/60 705/2 |
| 2004/0165063 | A1 * | 8/2004 | Iida | H04N 1/00342 348/143 |
| 2004/0211883 | A1 * | 10/2004 | Imagawa | G07C 9/00 250/208.1 |
| 2004/0239777 | A1 * | 12/2004 | Nakamura | H04N 1/00161 348/239 |
| 2004/0245334 | A1 * | 12/2004 | Sikorski | G06F 1/1626 235/383 |
| 2005/0007553 | A1 * | 1/2005 | Romanoff | F16M 11/18 352/243 |
| 2005/0018073 | A1 * | 1/2005 | Pilu | H04N 5/2251 348/375 |
| 2005/0041837 | A1 * | 2/2005 | Fan | G06T 7/0012 382/103 |
| 2005/0179553 | A1 * | 8/2005 | Fujie | G08B 13/19669 340/573.4 |
| 2006/0045311 | A1 * | 3/2006 | Shibuya | G06T 7/20 382/103 |
| 2006/0111123 | A1 * | 5/2006 | Nerat | G06K 7/0008 455/456.1 |
| 2006/0133695 | A1 * | 6/2006 | Obinata | G06T 1/60 382/296 |
| 2006/0136303 | A1 * | 6/2006 | Bell | G06Q 30/0641 705/26.8 |
| 2006/0256959 | A1 * | 11/2006 | Hymes | H04M 1/72547 379/433.04 |
| 2006/0265442 | A1 * | 11/2006 | Palayur | G06F 1/1626 708/200 |
| 2006/0266563 | A1 * | 11/2006 | Kaplan | G01G 19/58 177/245 |
| 2006/0267770 | A1 * | 11/2006 | Sanari | G08B 13/19645 340/572.1 |
| 2006/0280496 | A1 * | 12/2006 | Tanoue | H04N 1/00283 396/287 |
| 2007/0143690 | A1 * | 6/2007 | Nakajima | G09G 5/14 715/750 |
| 2008/0069449 | A1 * | 3/2008 | Cho | H04N 1/32101 382/195 |
| 2008/0069480 | A1 * | 3/2008 | Aarabi | G06F 16/51 382/305 |
| 2008/0284738 | A1 * | 11/2008 | Hovden | G06F 1/1626 345/173 |
| 2009/0016650 | A1 * | 1/2009 | Bell | H04N 5/2256 382/313 |
| 2009/0051246 | A1 * | 2/2009 | Mueller | H01L 41/053 310/313 R |
| 2009/0051542 | A1 * | 2/2009 | Jung | H04L 67/36 340/573.1 |
| 2009/0055853 | A1 * | 2/2009 | Jung | H04H 60/45 725/10 |
| 2009/0145965 | A1 * | 6/2009 | Davis | G06Q 30/0603 235/383 |
| 2009/0219279 | A1 * | 9/2009 | Ishii | H04N 9/3123 345/214 |
| 2009/0239579 | A1 * | 9/2009 | Lee | G06F 1/1626 455/556.1 |
| 2010/0018249 | A1 * | 1/2010 | Burgers | F17C 5/06 62/657 |
| 2010/0049624 | A1 * | 2/2010 | Ito | G06Q 30/00 705/26.1 |
| 2010/0069115 | A1 * | 3/2010 | Liu | H04M 1/72569 455/556.1 |
| 2010/0070173 | A1 * | 3/2010 | Sakamoto | G01C 21/20 701/533 |
| 2010/0086213 | A1 * | 4/2010 | Momoi | G06K 9/00362 382/195 |
| 2010/0088630 | A1 * | 4/2010 | Morris | H04N 21/43615 715/781 |
| 2010/0092034 | A1 * | 4/2010 | Arnaud | G06K 9/3216 382/103 |
| 2010/0179005 | A1 * | 7/2010 | Meadows | G01S 19/19 473/407 |
| 2010/0187219 | A1 * | 7/2010 | Besore | F25D 21/04 219/494 |

(56) References Cited

U.S. PATENT DOCUMENTS

| | | | |
|---|---|---|---|
| 2010/0208057 A1* | 8/2010 | Meier | G06T 15/00 348/135 |
| 2010/0253141 A1* | 10/2010 | Cara | G07C 9/00309 307/9.1 |
| 2011/0006887 A1* | 1/2011 | Shaull | G05B 15/02 340/12.37 |
| 2011/0011936 A1 | 1/2011 | Morandi et al. | |
| 2011/0071698 A1* | 3/2011 | Glasser | H02K 7/1823 700/296 |
| 2011/0169946 A1* | 7/2011 | Rudin | H04N 7/18 348/135 |
| 2011/0298829 A1* | 12/2011 | Stafford | G06K 9/3208 345/659 |
| 2011/0307174 A1* | 12/2011 | Uusitalo | G01C 21/3682 701/300 |
| 2012/0026324 A1* | 2/2012 | Kiyoshige | G01S 19/14 348/142 |
| 2012/0062758 A1* | 3/2012 | Devine | H04W 4/024 348/222.1 |
| 2012/0128025 A1* | 5/2012 | Huppi | G01J 5/02 374/121 |
| 2012/0214542 A1* | 8/2012 | Sarin | H04M 1/72519 455/550.1 |
| 2012/0218423 A1* | 8/2012 | Smith | G06K 9/00369 348/207.1 |
| 2012/0231881 A1* | 9/2012 | Matsunaga | A63F 13/5252 463/31 |
| 2012/0242798 A1* | 9/2012 | McArdle | H04N 21/4312 348/46 |
| 2012/0261481 A1* | 10/2012 | Donlan | F24D 19/10 237/12 |
| 2012/0284132 A1* | 11/2012 | Kim | G07G 1/0081 705/20 |
| 2013/0050233 A1* | 2/2013 | Hirsch | G09G 5/00 345/589 |
| 2013/0057571 A1* | 3/2013 | Harris | G06F 1/1613 345/619 |
| 2013/0100017 A1* | 4/2013 | Papakipos | G06F 1/1694 345/158 |
| 2013/0135315 A1* | 5/2013 | Bares | G11B 27/031 345/473 |
| 2013/0241818 A1* | 9/2013 | Ohta | G06F 1/1626 345/156 |
| 2013/0265440 A1* | 10/2013 | Mizuta | H04N 5/23203 348/169 |
| 2013/0269013 A1* | 10/2013 | Parry | H04L 63/0428 726/7 |
| 2013/0274836 A1* | 10/2013 | Downs | A61N 5/0613 607/88 |
| 2013/0281208 A1* | 10/2013 | Lyons | G06K 9/00711 463/33 |
| 2013/0284806 A1 | 10/2013 | Margalit | |
| 2013/0342696 A1* | 12/2013 | Cai | G06K 9/22 348/148 |
| 2014/0025545 A1* | 1/2014 | Carson | G06Q 30/018 705/29 |
| 2014/0092053 A1* | 4/2014 | Ng | G06F 3/04166 345/174 |
| 2014/0105468 A1* | 4/2014 | Kawashita | H04N 9/8227 382/118 |
| 2014/0172607 A1* | 6/2014 | Skiles | G01G 19/4144 705/23 |
| 2014/0174732 A1* | 6/2014 | Goodwin | E21B 47/01 166/255.1 |
| 2014/0279272 A1* | 9/2014 | Inman | G06Q 30/0635 705/26.81 |
| 2014/0326771 A1* | 11/2014 | Almalki | A45F 3/04 224/576 |
| 2014/0343846 A1* | 11/2014 | Goldman | G01C 21/165 701/525 |
| 2015/0005588 A1* | 1/2015 | Herken | A61B 7/04 600/301 |
| 2015/0015708 A1* | 1/2015 | Collett | H04N 7/185 348/148 |
| 2015/0039942 A1* | 2/2015 | Che | G06F 11/3409 714/38.1 |
| 2015/0086107 A1 | 3/2015 | Dedeoglu et al. | |
| 2015/0097769 A1* | 4/2015 | Russell | G09G 5/006 345/156 |
| 2015/0100167 A1* | 4/2015 | Sloo | H04L 67/24 700/278 |
| 2015/0116501 A1* | 4/2015 | McCoy | G06T 7/292 348/169 |
| 2015/0120719 A1* | 4/2015 | Aarabi | G06F 16/5838 707/728 |
| 2015/0177828 A1* | 6/2015 | Bruderek | G06F 1/3265 345/156 |
| 2015/0178565 A1* | 6/2015 | Rivlin | G06T 7/004 382/103 |
| 2016/0103200 A1* | 4/2016 | LoPresti | G01C 21/206 348/169 |
| 2016/0173827 A1* | 6/2016 | Dannan | G08B 13/19608 348/143 |
| 2017/0323262 A1* | 11/2017 | Hillis | G06Q 10/0834 |

OTHER PUBLICATIONS

Kalnikaite, et al., "How to Nudge In Situ: Designing Lambent Devices to Deliver Information Salience in Supermarkets", ACM, In proceeding of: UbiComp 2011: Ubiquitous Computing, 13th International Conference, UbiComp 2011, Beijing, China, Sep. 17-21, 2011, Retrieved from Internet: <URL:http://www.researchgate. net/publication/221568350_How_to_nudge_in_Situ_designing_ lambent_devices_to_deliver_salient_information_in_supermarkets>.

Pop, Christian, "Introduction to the BodyCom Technology", AN1391, DS01391A, Microchip Technology, Inc., May 2, 2011.

Rhodes, et al., U.S. Appl. No. 13/449,214, The United States Patent and Trademark Office, filed Apr. 17, 2012.

* cited by examiner

DETERMINING POSITION OF A USER RELATIVE TO A TOTE

BACKGROUND

Retailers, wholesalers, and other product distributors typically maintain an inventory of various items that may be ordered, purchased, leased, borrowed, rented, viewed, etc. by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can pick items from inventory and take them to a cashier for purchase, rental, and so forth. Many of those physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers and the like. In each instance, for an item to be moved from one location to another, it is picked from its current location and transitioned to a new location. It is often desirable to provide information associated with movement of inventory or other information about operation of the facility to users thereof.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
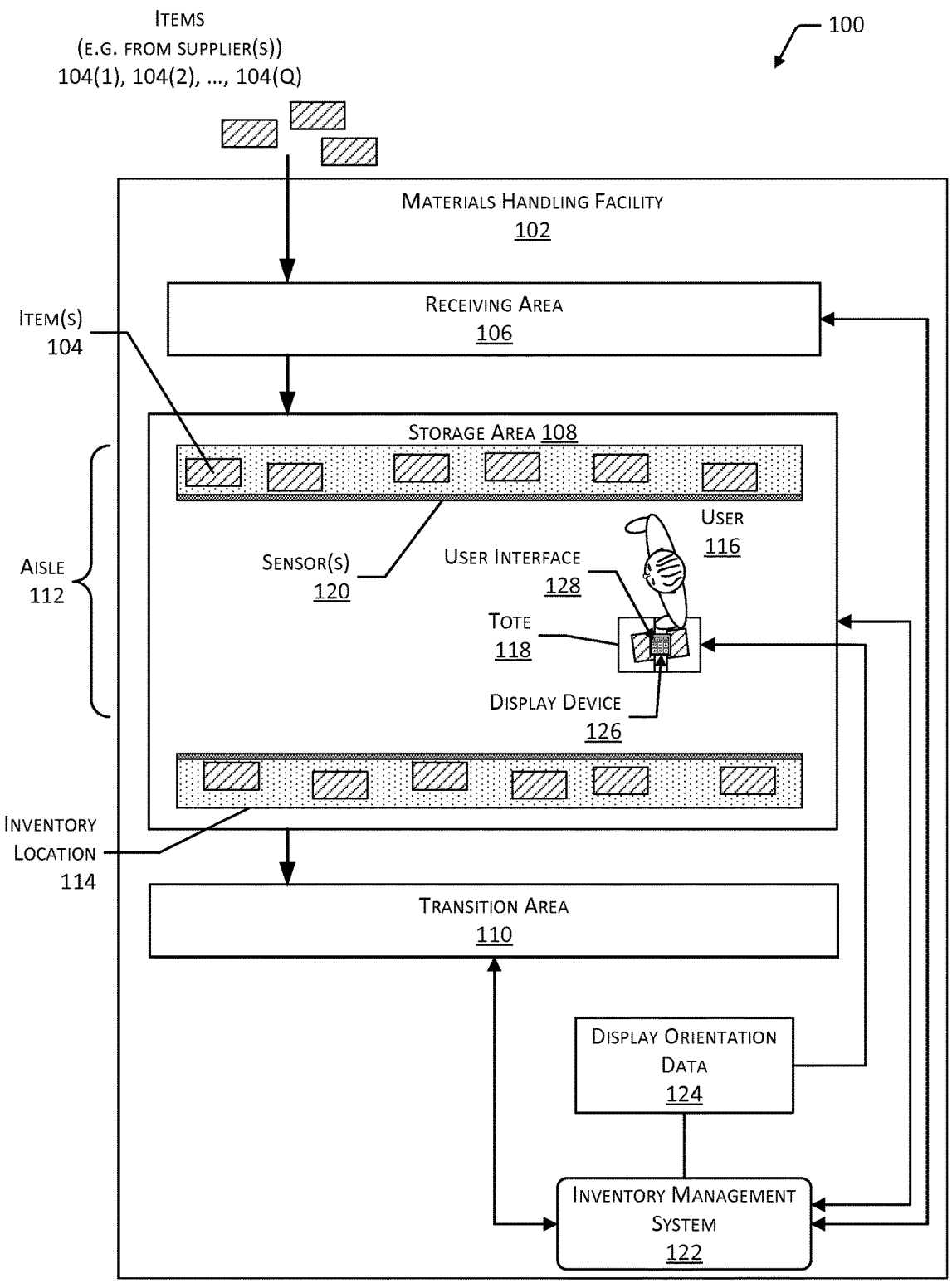
FIG. 1 is a block diagram illustrating a materials handling facility configured to present a user interface oriented with a user based on a relative position to a tote, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems and techniques for determining position of a user relative to a tote in a materials handling facility (facility). The facility may include, or have access to, an inventory management system. The inventory management system may be configured to maintain information about items within the facility. For example, the inventory management system may maintain information indicative of quantities of items at various inventory locations, movement of items, and so forth.

The inventory management system may generate a user interface which presents information associated with operation of the facility to the user. The user interface may include a single image, or several images or other elements. For example, the user interface may present a list of items to be picked, confirm identification of an item which has been picked, specify location of an item to be picked, and so forth. The user interface may be presented to the user by way of one or more display devices.

One or more of the display devices may be located onboard the tote. For example, a display device may be positioned on a handle or an edge of a handheld tote. As the user moves through the facility, they may look at the user interface presented on the display device to acquire information.

Elements of the user interface may be designed for comprehension with regard to a user orientation. For example, English text is generally read left-to-right, and top-to-bottom. Differences between user interface element orientation and the user orientation may result in an adverse user experience. Continuing the example, users may find it unpleasant to read English text upside-down, see faces upside-down, and so forth.

A relative position between the tote and the user may change over time, based on usage, and so forth. For example, a tote may be carried by the user with a left arm, then by a right arm. As a result, the user may be first to the right of the tote, then to the left of the tote. As the relative position between the tote and the user changes, the user interface element orientation and the user orientation may differ. As mentioned above, this difference may result in an unpleasant user experience.

The systems and techniques described in this disclosure may be used to generate display orientation data and use this data to present a user interface. The display orientation data may be based on a tote placement. For example, the display orientation data may comprise information indicative of a rotation to be applied to the user interface, with the direction and extent of the rotation based on the tote placement. The tote placement is indicative of relative spatial arrangement between a tote and a user. Continuing the example, where the tote is moved from a tote placement on a left side of the user to a right side, the display orientation data may indicate that the user interface (or elements thereof) should be rotated 180 degrees.

The determination of the display orientation data may comprise use of a lookup table, set of conditional statements, or other data which associates a particular tote placement with a particular orientation. For example, tote placement indicating the user is to the right of the tote may result in the user interface being rotated 270 degrees. Continuing the example, tote placement indicating the user is to the left of the tote may result in the user interface being rotated 90 degrees. The rotation indicated by the display orientation data may be relative to a default or initial orientation associated with the display device.

The determination of the display orientation data may also include consideration of one or more characteristics. The characteristics may be associated with a particular user or group of users, particular tote, display device, and so forth. For example, users may be assumed (unless otherwise indicated) to have the ability to rotate their head and look left and right approximately 90 degrees to either side of straight ahead relative to their torso. In another example, particular display devices may be limited to present user interface elements in particular orientations.

The display orientation data may be generated based at least in part on sensor data acquired by one or more sensors. The sensors may include imaging sensors such as cameras, proximity sensors, weight sensors, and so forth. In some implementations the sensors may be onboard the tote. For example, the tote may include an onboard camera, proximity sensor, and so forth.

In a first implementation, imaging sensors in the facility may be used to acquire images of the user and the tote. Based at least in part on the information in the images, tote placement indicative of which side of the tote the user is adjacent to may be determined. Based on the tote placement, the display orientation data is generated and may be used to orient the user interface presented on the display device of the tote.

In a second implementation, one or more proximity sensors onboard the tote are configured to detect the presence of an object, such as the user. Based on the field of view or detection zone of the proximity sensor and known placement of the proximity sensor on the tote, the tote placement may be determined. For example, a proximity indication from a proximity sensor on the left side of the tote may generate tote placement data indicative of the user being to the left of the tote.

In a third implementation, imaging sensors onboard the tote may acquire an image which includes at least a portion of the user. By determining a position within an image frame of a group of limited motion pixels, the position of the user may be determined. For example, the camera may have a wide angle lens oriented to look upwards. The resulting image includes a side of the user, as well as various other objects in the field of view. As the tote is moved by the user, other objects and their corresponding pixels move within an image frame. For example, light fixtures, shelving, other users, and so forth move into and out of the image frame as the user moves through the facility. However, the group of limited motion pixels associated with the user remain relatively fixed in the image frame. Based on the position of the group of limited motion pixels within the image frame, the tote placement may be determined.

In a fourth implementation, weight sensors may be used to determine the tote placement. Weight data from the weight sensors may be used to determine a position of a user's center-of-mass. For example, the weight on the user's left foot may be greater when holding a loaded tote in the left arm. By analyzing the force applied by each of the user's feet, the tote placement may be determined. In some implementations a comparison may be made between the user's center-of-mass when unloaded (not holding the tote) and loaded (holding the tote).

Furthermore, one or more of the various implementations may be combined. For example, the first implementation using overhead imaging sensors and the fourth implementation using the weight sensors may be used in conjunction with one another.

By generating and using the display orientation data to reduce or eliminate divergence between the user orientation and the user interface element orientation, overall user experience may be improved. The improved user experience may result in increased accuracy of the inventory management system as used by the user.

Illustrative System

An implementation of a materials handling system 100 configured to store and manage inventory items is illustrated in FIG. 1. A materials handling facility 102 (facility) comprises one or more physical structures or areas within which one or more items 104(1), 104(2), . . . , 104(Q) may be held. As used in this disclosure, letters in parenthesis such as "(Q)" indicate an integer value. The items 104 comprise physical goods, such as books, pharmaceuticals, repair parts, electronic gear, and so forth.

The facility 102 may include one or more areas designated for different functions with regard to inventory handling. In this illustration, the facility 102 includes a receiving area 106, a storage area 108, and a transition area 110.

The receiving area 106 may be configured to accept items 104, such as from suppliers, for intake into the facility 102. For example, the receiving area 106 may include a loading dock at which trucks or other freight conveyances unload the items 104.

The storage area 108 is configured to store the items 104. The storage area 108 may be arranged in various physical configurations. In one implementation, the storage area 108 may include one or more aisles 112. The aisle 112 may be configured with, or defined by, inventory locations 114 on one or both sides of the aisle 112. The inventory locations 114 may include one or more of shelves, racks, cases, cabinets, bins, floor locations, or other suitable storage mechanisms. The inventory locations 114 may be affixed to the floor or another portion of the facility's structure, or may be movable such that the arrangements of aisles 112 may be reconfigurable. In some implementations, the inventory locations 114 may be configured to move independently of an outside operator. For example, the inventory locations 114 may comprise a rack with a power source and a motor, operable by a computing device to allow the rack to move from one position within the facility 102 to another.

One or more users 116(1), 116(2), . . . , 116(U) and totes 118(1), 118(2), 118, . . . , 118(T) or other material handling apparatus may move within the facility 102. For example, the user 116 may move about within the facility 102 to pick or place the items 104 in various inventory locations 114, placing them on the tote 118 for ease of transport. The tote 118 is configured to carry or otherwise transport one or more items 104 and may include, but is not limited to, a basket, a cart, a bag, and so forth. In other implementations, other agencies such as robots, forklifts, cranes, aerial drones, and so forth, may move about the facility 102 picking, placing, or otherwise moving the items 104.

One or more sensors 120 may be configured to acquire information in the facility 102. The sensors 120 may include, but are not limited to, weight sensors, vibration sensors, radio frequency (RF) receivers, imaging devices, temperature sensors, humidity sensors, and so forth. The sensors 120 may be stationary or mobile, relative to the facility 102. For example, the inventory locations 114 may contain cameras configured to acquire images of pick or placement of items 104 on shelves. In another example, the floor of the facility 102 may include weight sensors configured to determine a weight of the user 116 or other object thereupon.

During operation of the facility 102, the sensors 120 may be configured to provide information suitable for tracking how the items 104 move within the facility 102. For example, a series of images acquired by a camera may indicate removal of an item 104 from a particular inventory location 114 and placement within the tote 118. In another example, images acquired by the camera may be used to determine a relative position of the tote 118 with regard to the user 116. The sensors 120 are discussed in more detail below with regard to FIG. 2.

While the storage area 108 is depicted as having one or more aisles 112, inventory locations 114 storing the items 104, sensors 120, and so forth, it is understood that the receiving area 106, the transition area 110, or other areas of the facility 102 may be similarly equipped. Furthermore, the arrangement of the various areas within the facility 102 are depicted functionally rather than schematically. For example, in some implementations multiple different receiving areas 106, storage areas 108, and transition areas 110 may be interspersed rather than segregated.

The facility 102 may include, or be coupled to, an inventory management system 122. The inventory management system 122 is configured to interact with users 116 or devices such as sensors 120, robots, material handling equipment, computing devices, and so forth in one or more of the receiving area 106, the storage area 108, or the transition area 110.

The facility 102 may be configured to receive different kinds of items 104 from various suppliers, and to store them until a customer orders or retrieves one or more of the items 104. A general flow of items 104 through the facility 102 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise, commodities, perishables, or any suitable type of item, depending on the nature of the enterprise that operates the facility 102.

Upon being received from a supplier at receiving area 106, the items 104 may be prepared for storage. For example, in some implementations, items 104 may be unpacked, or otherwise rearranged. The inventory management system 122 may include one or more software applications executing on a computer system to provide inventory management functions. These inventory management functions may include maintaining information indicative of the type, quantity, condition, cost, location, weight, or any other suitable parameters with respect to the items 104. The items 104 may be stocked, managed, or dispensed in terms of countable, individual units or multiples, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 106, items 104 may be stored within the storage area 108. In some implementations, like items 104 may be stored or displayed together in the inventory locations 114 such as in bins, on shelves, hanging from pegboards, and so forth. In this implementation, all items 104 of a given kind are stored in one inventory location 114. In other implementations, like items 104 may be stored in different inventory locations 114. For example, to optimize retrieval of certain items 104 having frequent turnover within a large physical facility, those items 104 may be stored in several different inventory locations 114 to reduce congestion that might occur at a single inventory location 114.

When a customer order specifying one or more items 104 is received, or as a user 116 progresses through the facility 102, the corresponding items 104 may be selected or "picked" from the inventory locations 114 containing those items 104. In various implementations, item picking may range from manual to completely automated picking. For example, in one implementation, a user 116 may have a list of items 104 they desire and may progress through the facility 102 picking items 104 from inventory locations 114 within the storage area 108, and placing those items 104 into a tote 118. In other implementations, employees of the facility 102 may pick items 104 using written or electronic pick lists derived from customer orders. These picked items 104 may be placed into the tote 118 as the employee progresses through the facility 102.

After items 104 have been picked, they may be processed at a transition area 110. The transition area 110 may be any designated area within the facility 102 where items 104 are transitioned from one location to another, or from one entity to another. For example, the transition area 110 may be a packing station within the facility 102. When the item 104 arrives at the transition area 110, the items 104 may be transitioned from the storage area 108 to the packing station. Information about the transition may be maintained by the inventory management system 122.

In another example, if the items 104 are departing the facility 102 a list of the items 104 may be obtained and used by the inventory management system 122 to transition responsibility for, or custody of, the items 104 from the facility 102 to another entity. For example, a carrier may accept the items 104 for transport with that carrier accepting responsibility for the items 104 indicated in the list. In another example, a customer may purchase or rent the items 104 and remove the items 104 from the facility 102.

The inventory management system 122 may acquire sensor data from the one or more sensors 120 and generate display orientation data 124. The display orientation data 124 comprises information indicative of the direction which a display device 126 is to present a user interface 128. The display orientation data 124 may be expressed as an angular measurement indicating rotation from a known origin, an indication of a starting pixel address on the display device 126, and so forth. For example, the display orientation data 124 may indicate that the user interface 128 is to be rotated 90 degrees from an origin value.

In one implementation the orientation of the entire image of the user interface 128 may be rotated based at least in part on the display orientation data 124. For example, the entire image of the user interface may be rotated 90 degrees. In another implementation one or more elements of the user interface 128 may be rotated independently of the others. For example, individual elements may rotate around a central point of each element.

The inventory management system 122 may generate display orientation data 124 at predetermined intervals, upon occurrence of particular trigger events, and so forth. For example, the inventory management system 122 may generate the display orientation data 124 once per second.

The tote 118 may be configured to generate the display orientation data 124 onboard, receive the display orientation data 124, or both. The tote 118 may use the display orientation data 124 to adjust orientation of the user interface 128 as presented on the display device 126. By adjusting the orientation of the user interface 128, the user experience may be improved. For example, as the user 116 moves the tote 118 from being carried in the left hand to the right hand, the user interface 128 presented on the display device 126 may be rotated by 180 degrees. Once rotated, as the user 116 tips their head down and to the right to look at the display device 126, the elements of the user interface 128 such as text are appropriately oriented for ease of reading.

Figure 2:
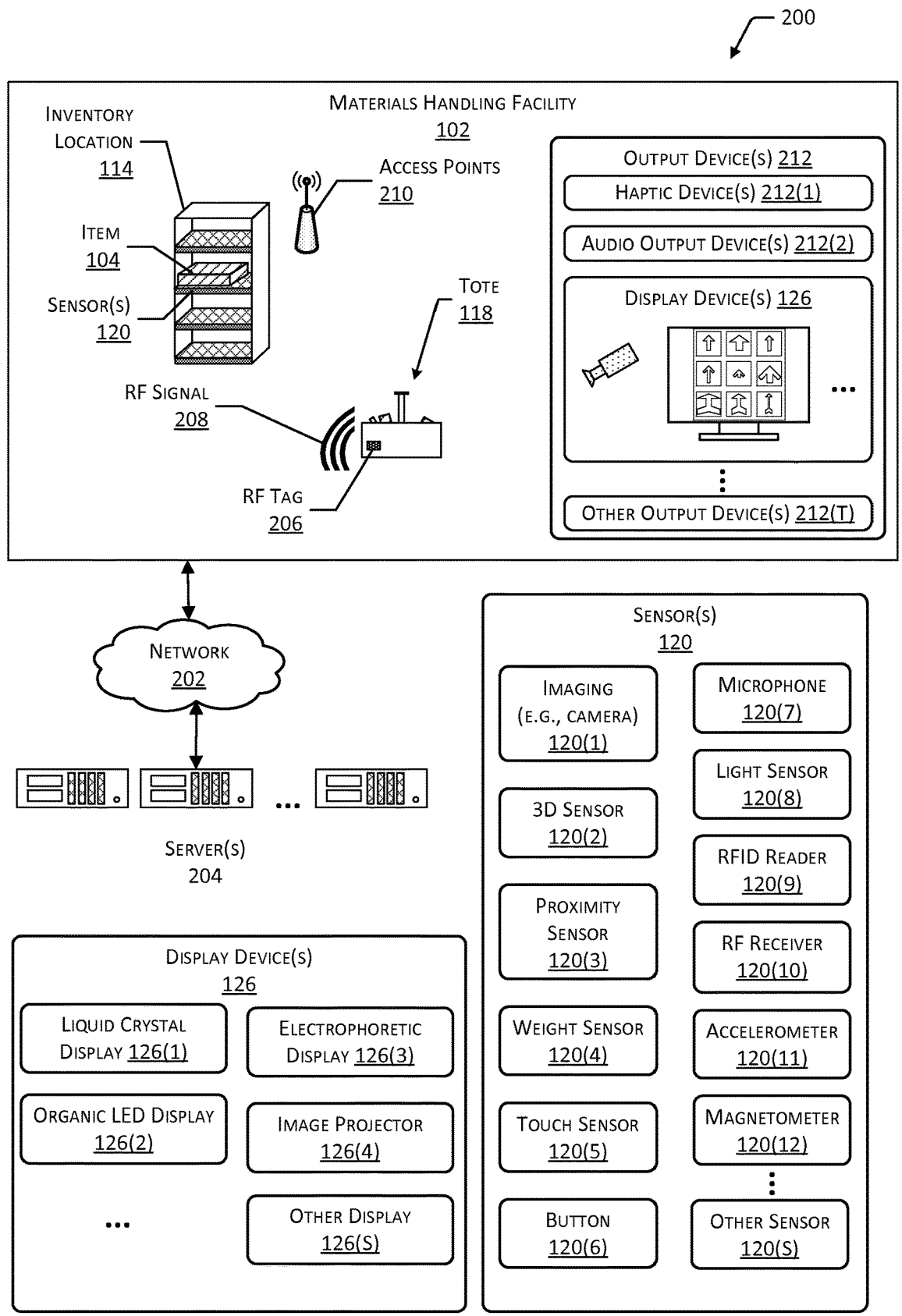
FIG. 2 is a block diagram illustrating additional details of the materials handling facility, according to some implementations.

FIG. 2 is a block diagram 200 illustrating additional details of the facility 102, according to some implementations. The facility 102 may be connected to one or more networks 202, which in turn connect to one or more servers 204. The network 202 may include private networks, public networks such as the Internet, or a combination thereof. The network 202 may utilize wired technologies (e.g., wires, fiber optic cable, and so forth), wireless technologies (e.g., radio frequency, infrared, acoustic, optical, and so forth), or other connection technologies. The network 202 is representative of any type of communication network, including one or more of data networks or voice networks. The network 202 may be implemented using wired infrastructure (e.g., copper cable, fiber optic cable, and so forth), a wireless infrastructure (e.g., cellular, microwave, satellite), or other connection technologies.

The servers 204 may be configured to execute one or more modules or software applications associated with the inventory management system 122. While the servers 204 are illustrated as being in a location outside of the facility 102, in other implementations at least a portion of the servers 204 may be located at the facility 102. The servers 204 are discussed in more detail below with regard to FIG. 3.

The users 116, the totes 118, or other objects in the facility 102 may be equipped with one or more radio frequency (RF) tags 206. The RF tags 206 are configured to emit an RF signal 208. In one implementation, the RF tag 206 may be a radio frequency identification (RFID) tag configured to emit the RF signal 208 upon activation by an external signal. For example, the external signal may comprise a radio frequency signal or a magnetic field configured to energize or activate the RFID tag. In another implementation, the RF tag 206 may comprise a transmitter and a power source configured to power the transmitter. For example, the RF tag 206 may comprise a Bluetooth Low Energy (BLE) transmitter and battery. In other implementations, the tag may use other techniques to indicate presence. For example, an acoustic tag may be configured to generate an ultrasonic signal which is detected by corresponding acoustic receivers. In yet another implementation, the tag may be configured to emit an optical signal. The optical signal may be emitted using infrared light, visible light, ultraviolet light, or a combination thereof.

The inventory management system 122 may be configured to use the RF tags 206 for one or more of identification of the object, determining a position of the object, and so forth. For example, the users 116 may wear RF tags 206, the totes 118 may have RF tags 206 affixed, and so forth. The tote 118 is configured to carry or otherwise transport one or more items 104. For example, the tote 118 may include a basket, a cart, a bag, and so forth. The tote 118 is discussed in more detail below.

Generally, the inventory management system 122 or other systems associated with the facility 102 may include any number and combination of input components, output components, and servers 204.

The one or more sensors 120 may be arranged at one or more locations within the facility 102. For example, the sensors 120 may be mounted on or within a floor, wall, or ceiling, at an inventory location 114, on the tote 118, may be carried or worn by the user 116, and so forth.

The sensors 120 may include one or more imaging sensors 120(1). These imaging sensors 120(1) may include cameras configured to acquire images of a scene. The imaging sensors 120(1) are configured to detect light in one or more wavelengths including, but not limited to, terahertz, infrared, visible, ultraviolet, and so forth. The inventory management system 122 may use image data acquired by the imaging sensors 120(1) during operation of the facility 102. For example, the inventory management system 122 may identify items 104, users 116, totes 118, and so forth based at least in part on their appearance within the image data.

One or more 3D sensors 120(2) may also be included in the sensors 120. The 3D sensors 120(2) are configured to acquire spatial or three-dimensional data, such as depth information, about objects within a sensor field-of-view. The 3D sensors 120(2) include range cameras, lidar systems, sonar systems, radar systems, structured light systems, stereo vision systems, optical interferometry systems, and so forth. The inventory management system 122 may use the three-dimensional data acquired to identify objects, determine a position of an object, and so forth. For example, the inventory management system 122 may determine the position of the user 116 with respect to the tote 118 based at least in part on the position in three-dimensional space of the user 116 and the tote 118.

One or more proximity sensors 120(3) may be included in the sensors 120. The proximity sensors 120(3) may be onboard or affixed to the tote 118. In some implementations the proximity sensors 120(3) are directional in operation, such that they determine presence of an object within a field of view or detection zone.

The proximity sensors 120(3) may use electrical, magnetic, optical, acoustic, or other phenomena to operate. For example, the proximity sensor 120(3) may measure capacitance of a conductor and determine proximity based on a change in that capacitance resulting from presence of a human body. In another example, the proximity sensor 120(3) may detect an infrared signal associated with the user 116. Different types of proximity sensors 120(3) may be combined on the same tote 118. For example, the tote 118 may have both optical and capacitive proximity sensors.

In some implementations, the proximity sensors 120(3) may be activated by contact, such as with a pressure-activated switched or touch sensor. For example, a pressure switch on the side of the tote may indicate the user 116 is holding the tote 118 against their body, or gripping the tote 118 in a particular way.

The proximity sensors 120(3) may be configured to discriminate between different compositions. For example, a capacitive proximity sensor 120(3) may be configured to be responsive to a human body and not a metal object. In another example, an infrared proximity sensor 120(3) may be sensitive to infrared light emitted by a human body.

The inventory management system 122 may use the data acquired by the proximity sensors 120(3) to determine a relative position of the user 116 with respect to the tote 118. For example, the tote 118 may include two proximity sensors 120(3)(1) and 120(3)(2) on a left and right side of the tote 118, respectively. Based at least in part on the output from the proximity sensor 120(3)(1) indicating an object is present and the proximity sensor 120(3)(2) indicating no object is present, the inventory management system 122 may determine the user 116 is to the left of the tote 118. Based on this determination, display orientation data 124 may be generated.

One or more weight sensors 120(4) are configured to measure the weight of a load, such as the item 104, the user 116, the tote 118, and so forth. The weight sensors 120(4) may be configured to measure the weights of the load at one or more of the inventory locations 114, the tote 118, or on the floor of the facility 102. The weight sensors 120(4) may include one or more sensing mechanisms to determine weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers which generate one or more signals based on an applied force, such as that of the load due to gravity. The inventory management system 122 may use the data acquired by the weight sensors 120(4) to identify an object, determining a location of an object, maintain shipping records, and so forth.

The sensors 120 may include one or more touch sensors 120(5). The touch sensors 120(5) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The position of that change in electrical resistance within the material may indicate the position of the touch. The inventory management system 122 may use data from the touch sensors 120(5) to receive information from the user 116. For example, the touch sensor 120(4) may be integrated with a display device 126 to provide a touchscreen with which the user 116 may select from a menu one or more particular items 104 for picking.

One or more buttons 120(6) are configured to accept input from the user 116. The buttons 120(6) may comprise mechanical, capacitive, optical, or other mechanisms. For example, the buttons 120(6) may comprise mechanical switches configured to accept an applied force from a touch of the user 116 to generate an input signal. The inventory management system 122 may use data from the buttons 120(6) to receive information from the user 116. For example, the tote 118 may be configured with a button 120(6) in a handle such that the button 120(6) is activated while the user 116 is holding the handle. The inventory management system 122 may use this information to ensure that the user 116 is proximate to the tote 118, and adjust the user interface 128 based on this proximity.

One or more microphones 120(7) may be configured to acquire information indicative of sound present in the environment. In some implementations arrays of microphones 120(7) may be used. These arrays may implement beamforming techniques to provide for directionality of gain. The inventory management system 122 may use the one or more microphones 120(7) to acquire information from acoustic tags, accept voice input from the users 116, determine the position of one or more users 116 in the facility 102, determine ambient noise level, and so forth. For example, the inventory management system 122 may determine the ambient noise level proximate to the user 116 is high, based on input from the microphones 120(7). Based on this determination, the inventory management system 122 may increase the font size of the text information presented by the user interface 128, or increase a volume of audible user interface output.

The sensors 120 may include one or more light sensors 120(8). The light sensors 120(8) may be configured to provide information associated with ambient lighting conditions such as a level of illumination. Information acquired by the light sensors 120(8) may be used by the inventory management system 122 to adjust a level or intensity of the display devices 126. For example light sensor 120(8) may indicate that a portion of the facility 102 is brightly lit by direct sunlight, and the intensity of illumination provided by the display devices 126 during presentation of the user interface 128 may be increased to maintain visibility under these brightly lit conditions.

One more radio frequency identification (RFID) readers 120(9), near field communication (NFC) systems, and so forth may also be provided in the sensors 120. For example the RFID readers 120(9) may be configured to read the RF tags 206. Information acquired by the RFID reader 120(9) may be used by the inventory management system 122 to identify an object associated with the RF tag 206 such as the item 104, the user 116 the tote 118, and so forth. For example, based on information from the RFID readers 120(9), a velocity of the RF tag 206 may be determined and used as kinematic data.

One or more RF receivers 120(10) may also be provided. In some implementations the RF receivers 120(10) may be part of transceiver assemblies. The RF receivers 120(10) may be configured to acquire RF signals 208 associated with Wi-Fi™ Bluetooth®, ZigBee®, 3G, LTE, or other wireless data transmission technologies. The RF receivers 120(10) may provide information associated with data transmitted via radio frequencies, signal strength of RF signals 208, and so forth. For example, information from the RF receivers 120(10) may be used by the inventory management system 122 to determine a location of an RF tag 206.

The sensors 120 may include one or more accelerometers 120(11), which may be worn or carried by the user 116, mounted to the tote 118, and so forth. The accelerometers 120(11) may provide information such as the direction and magnitude of an imposed acceleration. Kinematic data such as rate of acceleration, determination of changes in direction, speed, and so forth may be determined using the accelerometers 120(11).

A magnetometer 120(12) may be used to determine a heading by measuring ambient magnetic fields, such as the terrestrial magnetic field. The magnetometer 120(12) may be worn or carried by the user 116, mounted to the tote 118, and so forth. For example, the magnetometer 120(12) worn by the user 116 may act as a compass and provide information indicative of which way the user 116 is facing.

The sensors 120 may include other sensors 120(S) as well. For example the other sensors 120(S) may include ultrasonic rangefinders, thermometers, barometric sensors, hygrometers, or biometric input devices including but not limited to fingerprint readers or palm scanners. For example, the inventory management system 122 may use information acquired from thermometers and hygrometers in the facility 102 to modify the user interface 128 to direct the user 116 to pick particular items 104 from a first inventory location 114(1) in preference to a second inventory location 114(2).

The facility 102 may include one or more access points 210 configured to establish one or more wireless networks. The access points 210 may use Wi-Fi™, near field communication (NFC), Bluetooth®, or other technologies to establish wireless communications between a device and the network 202. The wireless networks allow the devices to communicate with one or more of the inventory management system 122, the sensors 120, the display devices 126, the RF tag 206, a communication device of the tote 118, or other devices.

Output devices 212 may also be provided in the facility 102. The output devices 212 are configured to generate signals which may be used to provide information to the user 116. The inventory management system 122 may use the output devices 212 to present the user interface 128. The user interface 128 may be configured to stimulate one or more senses of the user 116. For example, the user interface 128 may comprise visual, audible, and haptic output.

Haptic output devices 212(1) are configured to provide a signal which results in a tactile sensation of the user 116. The haptic output devices 212(1) may use one or more mechanisms such as electrical stimulation or mechanical displacement to provide the signal. For example, the haptic output devices 212(1) may be configured to generate a modulated electrical signal which produces an apparent tactile sensation in one or more fingers of the user 116. In another example, the haptic output devices 212(1) may comprise piezoelectric or rotary motor devices configured to provide a vibration which may be felt by the user 116.

One or more audio output devices 212(2) are configured to provide acoustic output. The acoustic output includes one or more of infrasonic sound, audible sound, or ultrasonic sound. The audio output devices 212(2) may use one or more mechanisms to generate the sound. These mechanisms may include, but are not limited to: voice coils, piezoelectric elements, magnetorestrictive elements, or electrostatic elements, and so forth. For example, a piezoelectric buzzer or a speaker may be used to provide acoustic output.

The display devices 126 may be configured to provide output which may be seen by the user 116, or detected by a light-sensitive detector such as an imaging sensor 120(1) or light sensor 120(8). The output may be monochrome or color. The display devices 126 may be emissive, reflective, or both. An emissive display device 126 is configured to emit light during operation. For example, a light emitting diode (LED) is an emissive visual display device 126. In comparison, a reflective display device 126 relies on ambient light to present an image. For example, an electrophoretic display is a reflective display device 126. Backlights or front lights may be used to illuminate the reflective visual display device 126 to provide visibility of the information in conditions where the ambient light levels are low.

Mechanisms of the display devices 126 may include liquid crystal displays 126(1), organic light emitting diodes (LED) 126(2), electrophoretic displays 126(3), image projectors 126(4), or other display mechanisms 126(S). The other display mechanisms 126(S) may include, but are not limited to, micro-electromechanical systems (MEMS), spatial light modulators, electroluminescent displays, quantum dot displays, liquid crystal on silicon (LCOS) displays, cholesteric displays, interferometric displays, and so forth. These mechanisms are configured to emit light, modulate incident light emitted from another source, or both.

The display devices 126 may be configured to present images. For example, the display devices 126 may comprise a pixel-addressable display. The image may comprise at least a two-dimensional array of pixels, or a vector representation of an at least two-dimensional image.

In some implementations, the display devices 126 may be configured to provide non-image data, such as text characters, colors, and so forth. For example, a segmented electrophoretic display, segmented LED, and so forth may be used to present information such as a SKU number. The display devices 126 may also be configurable to vary the color of the text, such as using multicolor LED segments.

In some implementations, display devices 126 may be configurable to provide image or non-image output. For example, an electrophoretic display 126(3) with addressable pixels may be used to present images of text information, or all of the pixels may be set to a solid color to provide a colored panel.

The display devices 126 may include hardware processors, memory, and other elements configured to accept and process the user interface data 124 to present the user interface 128. For example, the display devices 126 may comprise one or more display mechanisms such as the electrophoretic display 126(3) driven by a computing device.

Other output devices 212(T) may also be present. For example, the output devices 212(T) may include lights, scent/odor dispensers, document printers, three-dimensional printers or fabrication equipment, and so forth.

Figure 3:
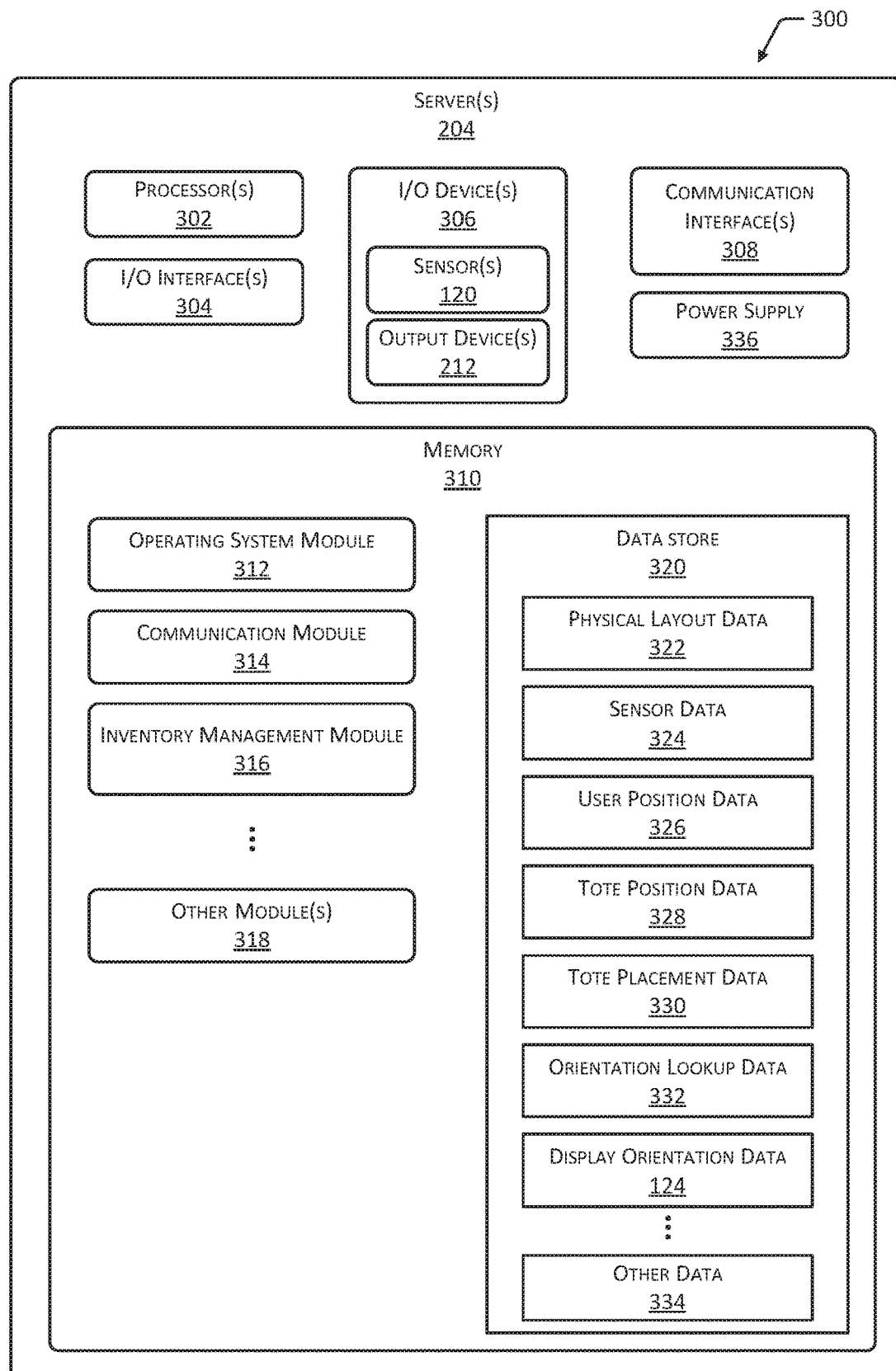
FIG. 3 illustrates a block diagram of a server configured to support operation of the facility, according to some implementations.

FIG. 3 illustrates a block diagram 300 of the server 204 configured to support operation of the facility 102, according to some implementations. The server 204 may be physically present at the facility 102, may be accessible by the network 202, or a combination of both. The server 204 does not require end-user knowledge of the physical location and configuration of the system that delivers the services. Common expressions associated with the server 204 may include "on-demand computing," "software as a service (SaaS)," "platform computing," "network-accessible platform," "cloud services," "data centers" and so forth. Services provided by the server 204 may be distributed across one or more physical or virtual devices.

The server 204 may include one or more hardware processors 302 (processors) configured to execute one or more stored instructions. The processors 302 may comprise one or more cores. The server 204 may include one or more input/output (I/O) interface(s) 304 to allow the processor 302 or other portions of the server 204 to communicate with other devices. The I/O interfaces 304 may comprise inter-integrated circuit (I2C), serial peripheral interface bus (SPI), Universal Serial Bus (USB) as promulgated by the USB Implementers Forum, RS-232, and so forth.

The I/O interface(s) 304 may couple to one or more I/O devices 306. The I/O devices 306 may include input devices such as one or more of a keyboard, mouse, scanner, and so forth. The I/O devices 306 may also include output devices such as one or more of a display, printer, audio speakers, and so forth. In some embodiments, the I/O devices 306 may be physically incorporated with the server 204 or may be externally placed.

The server 204 may also include one or more communication interfaces 308. The communication interfaces 308 are configured to provide communications between the server 204 and other devices, such as the sensors 120, routers, the access points 210, and so forth. The communication interfaces 308 may include devices configured to couple to personal area networks (PANs), wired and wireless local area networks (LANs), wired and wireless wide area networks (WANs), and so forth. For example, the communication interfaces 308 may include devices compatible with Ethernet, Wi-Fi™, and so forth.

The server 204 may also include one or more busses or other internal communications hardware or software that allow for the transfer of data between the various modules and components of the server 204.

As shown in FIG. 3, the server 204 includes one or more memories 310. The memory 310 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 310 provides storage of computer-readable instructions, data structures, program modules, and other data for the operation of the server 204. A few example functional modules are shown stored in the memory 310, although the same functionality may alternatively be implemented in hardware, firmware, or as a system on a chip (SOC).

The memory 310 may include at least one operating system (OS) module 312. The OS module 312 is configured to manage hardware resource devices such as the I/O interfaces 304, the I/O devices 306, the communication interfaces 308, and provide various services to applications or modules executing on the processors 302. The OS module 312 may implement a variant of the FreeBSD™ operating system as promulgated by the FreeBSD Project, other UNIX™ or UNIX-like variants, a variation of the Linux™ operating system as promulgated by Linus Torvalds, the Windows® Server operating system from Microsoft Corporation of Redmond, Wash., and so forth.

Also stored in the memory 310 may be one or more of the following modules. These modules may be executed as foreground applications, background tasks, daemons, and so forth.

A communication module 314 may be configured to establish communications with one or more of the sensors 120, one or more of the display devices 126, other servers 204, or other devices. The communications may be authenticated, encrypted, and so forth.

The memory 310 may store an inventory management module 316. The inventory management module 316 is configured to provide the inventory functions as described herein with regard to the inventory management system 122. For example, the inventory management module 316 may track items 104 between different inventory locations 114, to and from the totes 118, and so forth.

The inventory management module 316 may be configured to determine the display orientation data 124 based on sensor data from the one or more sensors 120. In one implementation, the display orientation data 124 may be sent or otherwise provided to the display device 126. In another implementation, the display orientation data 124 may be used to generate the user interface 128 with a particular orientation. For example, based on the display orientation data 124, the user interface 128 may be rendered in a particular orientation. Generation of the display orientation data 124 is discussed in more detail below.

The inventory management module 316 may be configured to recognize objects within the facility 102, and determine the position of those objects within the facility 102. In one implementation, the inventory management module 316 may use images acquired by the imaging sensors 120(1) to determine a position of the user 116, the tote 118, and so forth. The determination may use an artificial neural network which uses deep learning techniques in which the neural network has been trained to recognize particular objects such as users 116, totes 118, portions of the facility 102 such as the inventory locations 114, floor, and so forth. In other implementations, the inventory management module 316 may use other techniques such as pattern matching, edge matching, interpretation trees, geometric hashing, scale-invariant feature transform (SIRF) as published by David Lowe, speeded up robust features (SURF) which is based on sums of approximated two-dimensional Harr wavelet responses as published by Herbert Bay et. al, and so forth. One or more of these techniques may be used in to detect particular objects.

Once the object has been recognized, a position may be determined. The position may be expressed along one, two, or three dimensions. For example, coordinates for the object in two-dimensions may be calculated based on a position of the object within the images acquired by the imaging sensors 120(1). The position may be determined by using image data from a plurality of images using stereo or multi-vision techniques, based on apparent size and position within the frame, and so forth. For example, the size of the tote 118, size and arrangement of an optical marking on the tote 118, or other optically visible feature may be known. By determining an apparent size and an apparent placement within the image, the relative position within the field-of-view of the imaging sensor 120(1) is determined. Furthermore the distance may be determined from the apparent size, such as with stadiametric range finding techniques. In some implementations, a dimension of the user 116, such as a height, may be retrieved and used as well.

Information from other sensors 120 may also be used in conjunction with, or instead of, the imaging sensors 120 to determine position of an object in the facility 102. For example, the 3D sensor 120(2) may generate a point cloud of data describing the object in three dimensional space. The position of the object may be determined based on a known position of the 3D sensor 120(2) and the apparent distance to the object and apparent place within the image.

The inventory management module 316 may be configured to determine the tote placement by determining a relative position of the tote 118 with regard to the user 116. For example, an imaging sensor 120(1) may acquire an image which includes both the user 116 (or a portion thereof) and the tote 118 (or a portion thereof). A first apparent position in the image of a face of the user 116 may be identified, such as in the center of the image. A second apparent position in the image of at least a portion of the tote 118 may be determined, such as to the left of center. The relative spatial arrangement of the tote 118 to the user 116 may be determined based on the first apparent position and the second apparent position. Given the user 118 is facing the imaging sensor 120 such that their face is visible and in the center of the image, when the tote 118 is to the left of center the tote is located to the right of the user 116.

Other modules 318 may also be present in the memory 310. For example, an object identification module may be configured to use data from one or more of the sensors 120 to identify an object such as the item 104, the user 116, the tote 118, and so forth. For example, the object identification module may be configured to recognize the face of the user 116 in images acquired to assign an identity of that user 116.

The memory 310 may also include a data store 320 to store information. The data store 320 may use a flat file, database, linked list, tree, executable code, script, or other data structure to store the information. In some implementations, the data store 320 or a portion of the data store 320 may be distributed across one or more other devices including other servers 204, network attached storage devices and so forth.

The data store 320 may include physical layout data 322. The physical layout data 322 provides a mapping between different devices, such as the sensors 120, and physical positions within the facility 102. For example, the physical layout data 322 may indicate the coordinates within the facility 102 of the inventory locations 114.

The data store 320 may also include sensor data 324. The sensor data 324 comprises information acquired from, or based on, the one or more sensors 120. For example, the sensor data 324 may comprise three-dimensional information about an object in the facility 102. As described above, the sensors 120 may include an imaging sensor 120(1) which is configured to acquire one or more images which may be stored in the sensor data 324. The images may comprise one or more images, such as still images or video. The sensor data 324 may also include output from the proximity sensors 120(3) such as an indication of presence or absence of a detected object by a particular proximity sensor 120(3). Weight data acquired from the one or more weight sensors 120(4) may also be included in the sensor data 324.

User position data 326 and the tote position data 328 may also be stored in the data store 320. The user position data 326 provides information indicative of a position of the user 116. The position may be absolute with respect to the facility 102, or relative to another object or point of reference. For example, the user position data 326 may indicate that the user is 25.2 m along the aisle 112(1) and standing in front of the inventory location 114(47). In comparison, a relative position may indicate that the user 116 is 32 cm from the tote 118.

Similarly, the tote position data 328 provides information indicative of the position of the tote 118. This position may be absolute with respect to the facility 102, or relative to another object point of reference. The tote position data 328 may be determined using sensors 120 which are in the facility 102, carried by the user 116, onboard the tote 118, or a combination thereof. For example, the tote 118 may include sensors 120 able to generate tote position data 328, orientation data, and so forth.

The user position data 326, the tote position data 328, or both may be determined based on the sensor data 324. For example, images acquired by the imaging sensors 120(1), signal strength data from the RFID readers 120(9) or the RF receivers 120(10), and so forth may be used to determine the positions.

In some implementations, orientation of the user 116, the tote 118, or both may also be determined based on the sensor data 324. For example, data from a magnetometer 120(12) configured to act as a compass may provide information indicative of which direction the tote 118 is oriented.

The inventory management module 316 may access the user position data 326 and the tote position data 328 to generate tote placement data 330. The tote placement data 330 provides information indicative of relative spatial arrangement between the tote 118 and the user 116. For example, the tote placement data 330 may indicate that the user 116 is to the left, front, right, or back of the tote 118. In some implementations the tote placement data 330 may include information indicative of orientation of the tote 118, height, and so forth. The inventory management module 316 may use other sensor data 324, such as direction indications from the magnetometer 120(12), acceleration information from the accelerometer 120(11), and so forth.

The inventory management module 316 may use the tote placement data 330 to generate the display orientation data 124. In some implementations, this determination may include accessing orientation lookup data 332. The orientation lookup data 332 may be stored in the data store 320 and associates particular tote placements with particular orientations of the user interface 128 on the display device 126. For example, the tote placement of the user 116 to the right of the tote 118 may be associated with the display orientation data 124 indicating a rotation of 270°, while tote placement of the user 116 to the left of the tote 118 may be associated with the display orientation data 124 indicating rotation of 90°. In other implementations, the association between tote placement and orientation of user interface 128 may be defined as executable code, ranges of angles, and so forth.

As described above, the display orientation data 124 comprises information indicative of the direction which the display device 126 is to present the user interface 128. The display orientation data 124 may be expressed as an angular measurement indicating rotation from a known origin, an indication of a starting pixel address on the display device 126, and so forth. For example, the display orientation data 124 may indicate that the user interface 128 is to be rotated 90 degrees from an origin value.

The data store 320 may store other data 334 as well, such as user preferences, configuration files, permissions associated with user accounts, and so forth. For example, a refresh interval for updating the display orientation data 124 may be specified, user preferences for a preferred orientation may be designated, and so forth.

The server 204 may also include a power supply 336. The power supply 336 is configured to provide electrical power suitable for operating the components in the server 204.

Figure 4:
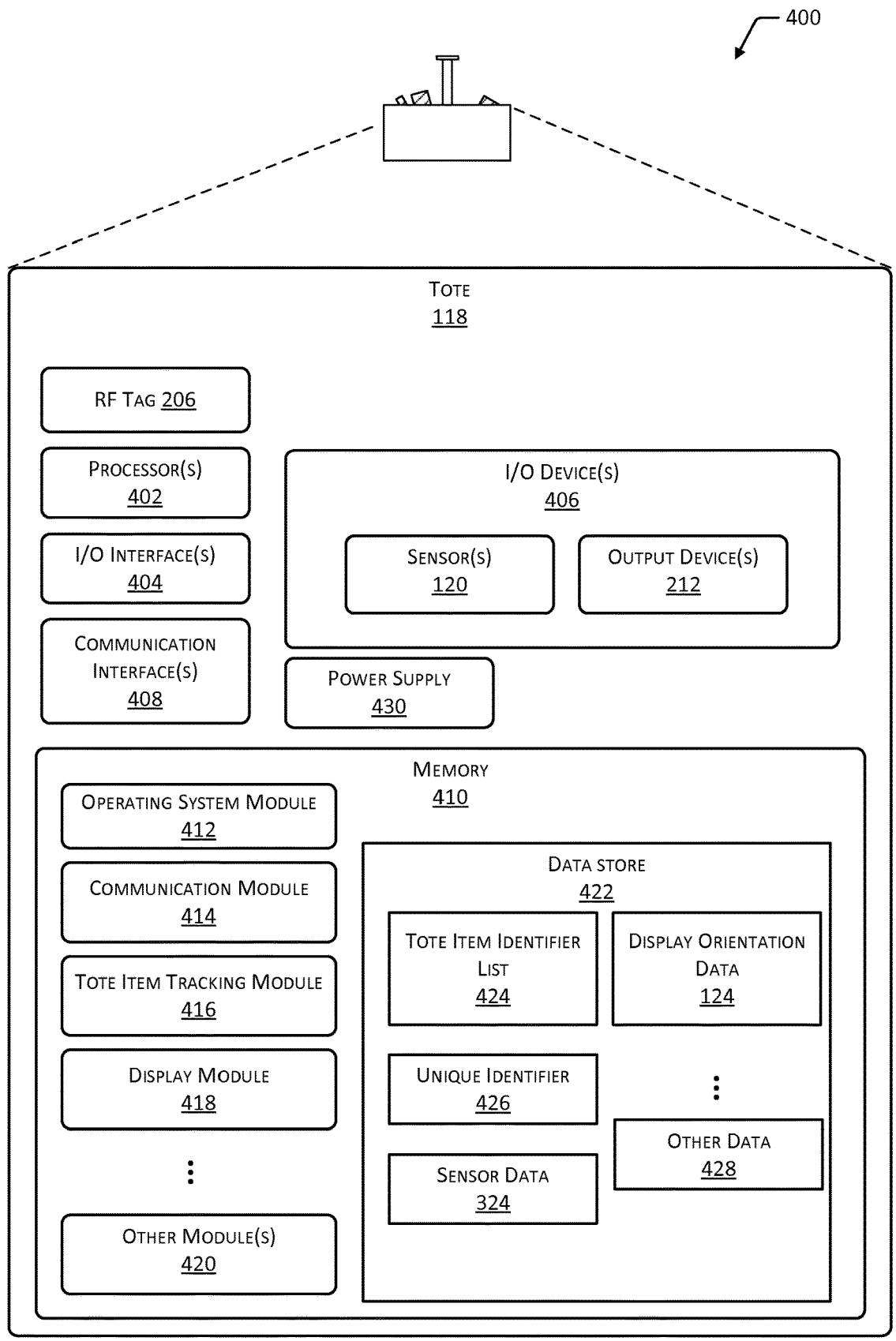
FIG. 4 is a block diagram of one or more components of a tote configured to determine a relative position of the user, according to some implementations.

FIG. 4 illustrates a block diagram 400 of the tote 118, according to some implementations. The tote 118 may include an RF tag 206. The RF tag 206 may be affixed to, integral with, or is otherwise associated with the tote 118. In some implementations, the tote 118 may have identifiers, tags, or other indicia thereupon. For example, a machine-readable optical code, such as a barcode or optical tag, may be affixed to or printed on a side of the tote 118.

The tote 118 may include one or more hardware processors 402 (processors) configured to execute one or more stored instructions. The processors 402 may comprise one or more cores. The tote 118 may include one or more I/O interface(s) 404 to allow the processor 402 or other portions of the tote 118 to communicate with other devices. The I/O interfaces 404 may include I2C, SPI, USB, RS-232, and so forth.

The I/O interface(s) 404 may couple to one or more I/O devices 406. The I/O devices 406 may include one or more of the input devices such as the sensors 120. As described above, the sensors 120 may include imaging sensors 120(1), proximity sensors 120(3), weight sensors 120(4), and so forth. The I/O devices 406 may also include haptic output devices 212(1), audio output devices 212(2), display devices 126, and so forth. In some implementations input and output devices may be combined. For example, a touchscreen display may incorporate a touch sensor 120(5) and a display device 126. In some embodiments, the I/O devices 406 may be physically incorporated with the tote 118 or may be externally placed.

The tote 118 may also include one or more communication interfaces 408. The communication interfaces 408 are configured to provide communications between the tote 118 and other devices, such as other totes 118, routers, access points 210, the servers 204, and so forth. The communication interfaces 408 may include devices configured to couple to PANs, LANs, WANs, and so forth. For example, the communication interfaces 408 may include devices compatible with Ethernet, Wi-Fi™, Bluetooth®, ZigBee, and so forth.

The tote 118 may also include one or more busses or other internal communications hardware or software that allow for the transfer of data between the various modules and components of the tote 118.

As shown in FIG. 4, the tote 118 includes one or more memories 410. The memory 410 comprises one or more CRSM as described above. The memory 410 provides storage of computer readable instructions, data structures, program modules and other data for the operation of the tote 118. A few example functional modules are shown stored in the memory 410, although the same functionality may alternatively be implemented in hardware, firmware, or as a SOC.

The memory 410 may include at least one OS module 412. The OS module 412 is configured to manage hardware resource devices such as the I/O interfaces 404, the I/O devices 406, the communication interfaces 408, and provide various services to applications or modules executing on the processors 402. The OS module 412 may implement a variant of the FreeBSD™ operating system as promulgated by the FreeBSD Project, other UNIX™ or UNIX-like variants, a variation of the Linux™ operating system, such as Android® as promulgated by Google, Inc. of Mountain View, Calif. Other OS modules 412 may be used, such as the Windows® operating system from Microsoft Corporation of Redmond, Wash., the LynxOS® from LynxWorks of San Jose, Calif., and so forth.

Also stored in the memory 410 may be one or more of the following modules. These modules may be executed as foreground applications, background tasks, daemons, and so forth.

A communication module 414 may be configured to establish communications with one or more of the sensors 120, display devices 126, the servers 204, or other devices. The communications may be authenticated, encrypted, and so forth.

The memory 410 may also store a tote item tracking module 416. The tote item tracking module 416 is configured to maintain a list of items 104, which are associated with the tote 118. For example, the tote item tracking module 416 may receive input from a user 116 by way of a touch screen display with which the user 116 may enter information indicative of the item 104 placed in the tote 118. In another example, the tote item tracking module 416 may receive input from the I/O devices 406, such as the weight sensor 120(4) and an RFID or NFC reader 120(9). The tote item tracking module 416 may send the list of items 104 to the inventory management system 122. The tote item tracking module 416 may also be configured to receive information from the inventory management system 122. For example, a list of items 104 to be picked may be presented within a user interface 128 on the display device 126 of the tote 118.

The memory 410 may include a display module 418. In one implementation the display module 418 may be configured to generate display orientation data 124 onboard the tote 118. Several techniques for the generational display orientation data 124 are discussed below. For example, the display module 418 may access information from the one or more imaging devices 120(1), proximity sensors 120(3), and so forth onboard the tote 118 and generate the display orientation data 124. Once generated, the display orientation data 124 may be sent to an external computing device, such as the server 204. In another implementation, the display module 418 may receive the display orientation data 124 from a device external to the tote 118, such as the server 204.

The display module 418 may be configured to generate the user interface 128 onboard the tote 118, or receive data indicative of the user interface 128 from one or more of the servers 204 or other devices and present the user interface 128 on a display device 126. For example, the display module 418 may receive hypertext markup language (HTML), cascading style sheet (CSS), JavaScript (JS), or other data from the server 204 for presentation on the display device 126 of the tote 118. The presentation of the user interface 128 may be based on the display orientation data 124.

The other modules 420 may also include a user authentication module which may be configured to receive input and authenticate or identify a particular user 116. For example, the user 116 may enter a personal identification number or may provide a fingerprint to the fingerprint reader to establish their identity.

The memory 410 may also include a data store 422 to store information. The data store 422 may use a flat file, database, linked list, tree, executable code, script, or other data structure to store the information. In some implementations, the data store 422 or a portion of the data store 422 may be distributed across one or more other devices including the servers 204, other totes 118, network attached storage devices and so forth.

The data store 422 may store a tote item identifier list 424. The tote item identifier list 424 may comprise data indicating one or more items 104 associated with the tote 118. For example, the identifier list 424 may indicate the items 104 which are present in the tote 118. The tote item tracking module 416 may generate or otherwise maintain a tote item identifier list 424.

A unique identifier 426 may also be stored in the memory 410. In some implementations, the unique identifier 426 may be stored in rewritable memory, write-once-read-only memory, and so forth. For example, the unique identifier 426 may be burned into a one-time programmable non-volatile memory, such as a programmable read-only memory (PROM). In some implementations, the unique identifier 426 may be part of a communication interface 408. For example, the unique identifier 426 may comprise a media access control address associated with a Bluetooth® interface.

The data store 422 may also store sensor data 324. The sensor data 324 may be acquired from the sensors 120 onboard the tote 118. Information associated with the user interface 128 as received by the tote 118 may also be stored in the data store 422.

The display orientation data 124, as generated onboard on the tote 118 or externally by the server 204 or another device may also be stored in the data store 422. In some implementations where the tote 118 determines the display orientation data 124 onboard the tote 118, other information such as the orientation look up data 332 may also be stored.

Other data 428 may also be stored within the data store 422. For example, tote configuration settings, user interface preferences, and so forth may also be stored.

The tote 118 may also include a power supply 430. The power supply 430 is configured to provide electrical power suitable for operating the components in the tote 118. The power supply 430 may comprise one or more of photovoltaic cells, batteries, wireless power receivers, fuel cells, capacitors, and so forth.

Figure 5:
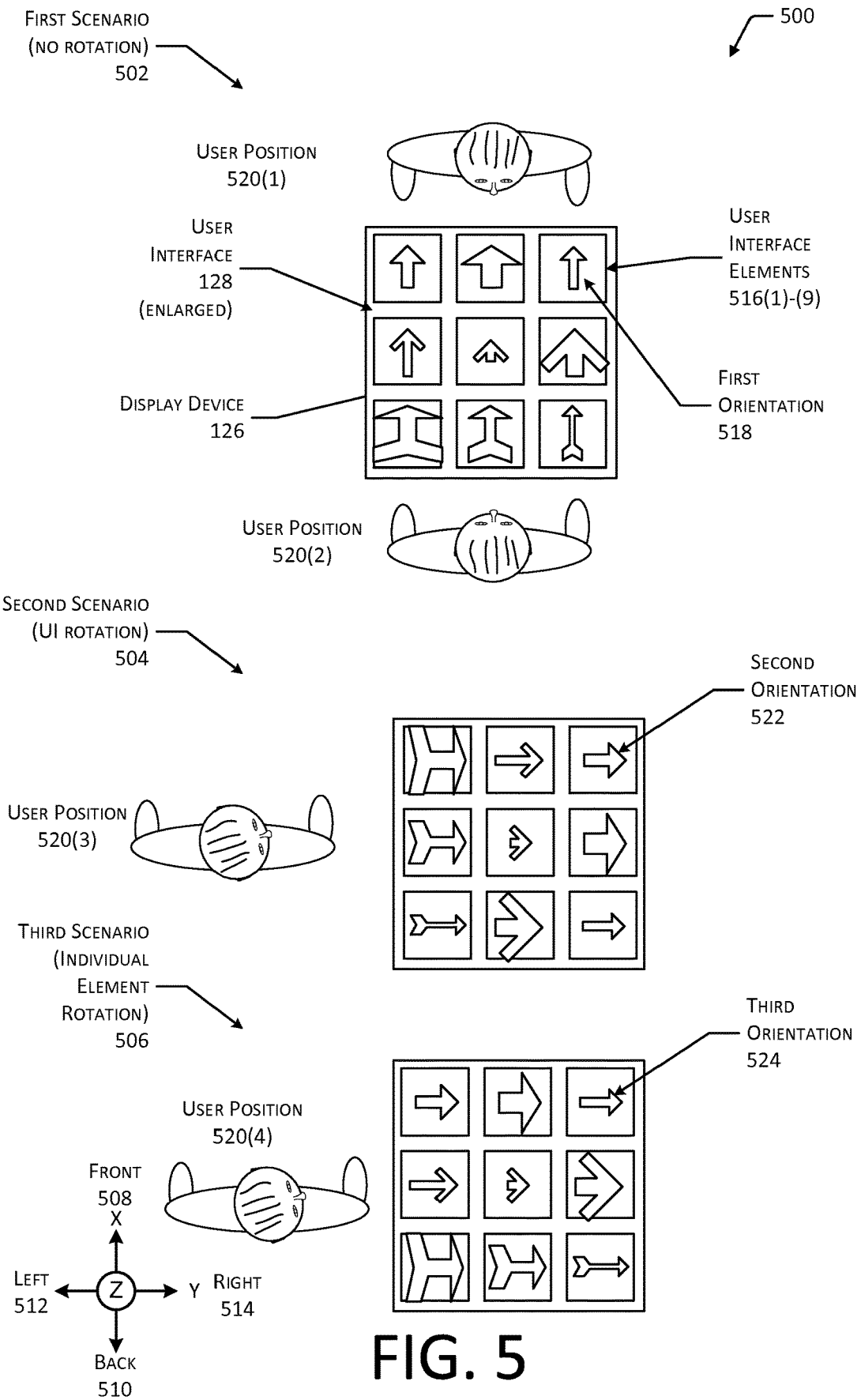
FIG. 5 illustrates reorientation of a user interface on a display device of the tote, according to some implementations.

FIG. 5 illustrates several scenarios 500 of reorientation of a user interface 128 on a display device 126 of the tote 118, according to some implementations. In this illustration a first scenario 502, a second scenario 504, and third scenario 506 are depicted in a top-down view. Directions in this illustration include front 508, back 510, left 512, and right 514. In this figure, the display device 126 and the user interface 128 presented thereon is enlarged for illustrative purposes and not by way of limitation. The user interface 128 comprises one or more user interface elements 516. Also by way of illustration, not as a limitation, the user interface elements 516 include nine tiles, 516(1)-(9). In other implementations, the user interface elements 516 may have different shapes or arrangements, more or fewer tiles, and so forth.

In the first scenario 502 the user interface 128 has not been rotated, and is presented in a default orientation with the user interface elements 516 in a first orientation 518. The user 116 at user position 520(1) in front 508 of the display device 126. As a result, from the perspective of the user position 520(1), the user interface elements 516 are upside down, making comprehension by the user 116 difficult or impossible. In comparison, the same user 116 at user position 520(2) to the back 510 of the display device 126, is readily able to read the user interface elements 516 which are right side up from this point of view.

In the second scenario 504 the entire user interface 128 has been rotated as a whole for presentation on the display. For example, the user interface 128 is shown here has been rotated 90° clockwise. This rotation may be based at least in part on the display orientation data 124. In this scenario, all of the user interface elements 516 of the user interface 128 are now in a second orientation 522. The relative arrangement between individual user interface elements 516 are maintained. In the second scenario, the user 116 is depicted at user position 520(3) which is to the left 512 of the display device 126. Because the user interface 128 in this scenario is presented in the second orientation 522, the user 116 when in the user position 520(3) may readily turn their head to the right 514 and see the information in the user interface 128 presented in an agreeable orientation.

In the third scenario 506, the user 116 is depicted at user position 520(4) which is to the left 512 of the display device 126. The individual user interface elements 516 have been rotated from the first orientation 518 by 90° to a third orientation 524, while remaining in their same relative arrangement on the display device 126. This rotation may be based at least in part on the display orientation data 124.

As illustrated here, each of the user interface elements 516 are rotated about a center point. In some implementations the rotation may be based on a point other than a geometric center of the user interface element 516. For example, the rotation of each user interface element 516 may be about a vertex of the user interface element 516.

Because the user interface elements 516 of the user interface 128 in this scenario are presented in the third orientation 524, the user 116 when in the user position 520(4) may readily turn their head to the right 514 and see the information in the user interface 128 presented in an agreeable orientation.

Figure 6:
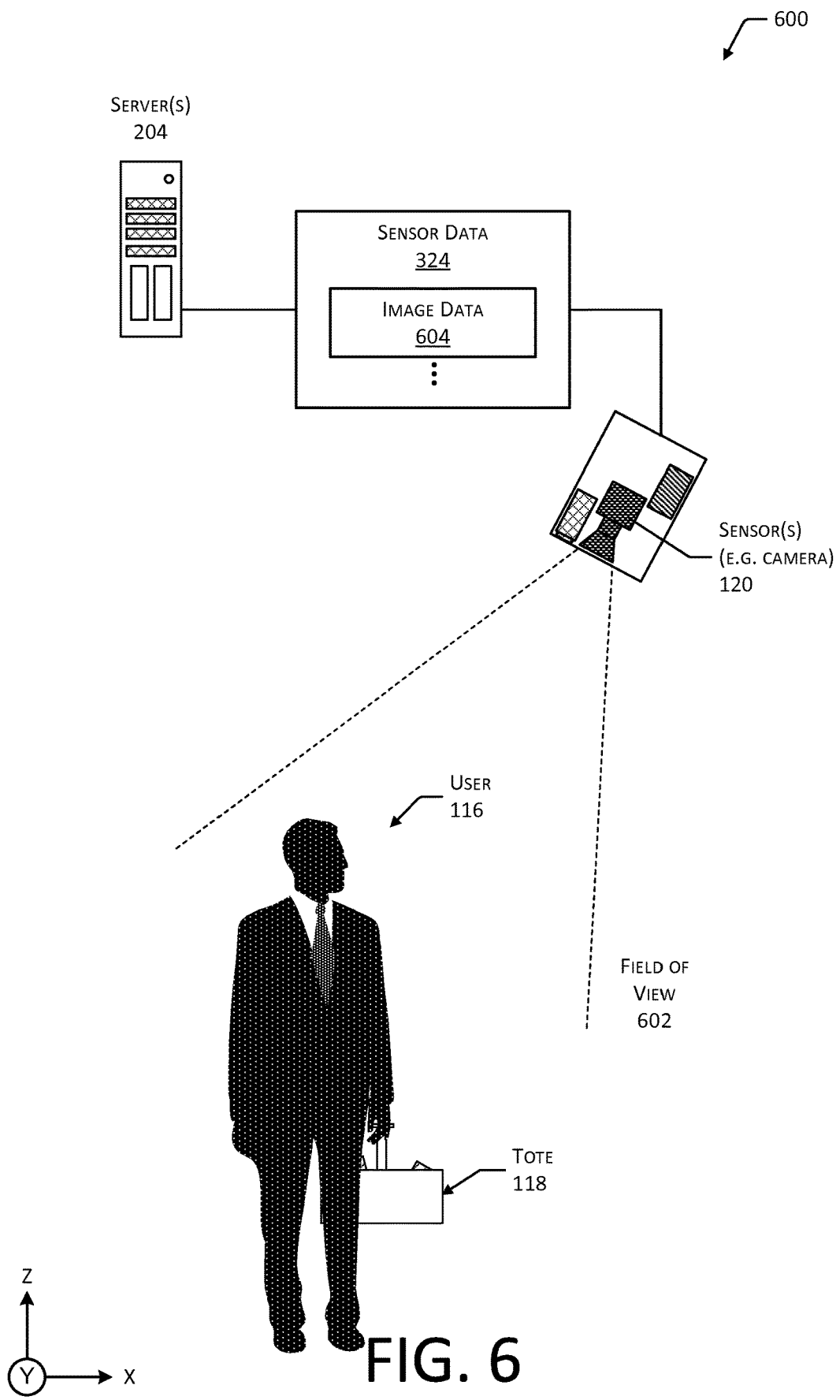
FIG. 6 illustrates a side view of an overhead imaging sensor acquiring an image of the user and the tote.

FIG. 6 illustrates a side view 600 of an overhead imaging sensor 120(1) acquiring an image of the user 116 and the tote 118. In some implementations, the facility 102 may include one or more sensors 120 which are configured to acquire an image from an overhead vantage point. The sensors 120 may include, but are not limited to, one or more of the imaging sensors 120(1), the 3D sensors 120(2), the microphones 120(7), the RFID readers 120(9), the RF receivers 120(10), and so forth. The sensors 120 have a field of view 602.

In this illustration, one of the sensors 120 comprises an imaging sensor 120(1) which is configured to generate image data 604. The field of view 602 depicted here includes the user 116 and the tote 118. The image data 604 may be provided to the inventory management system 122. For example, the inventory management module 316 executing on the server 204 may process the image data 604 to determine the tote placement data 330. This process is discussed in more detail below with regard to FIG. 11.

Figure 7:
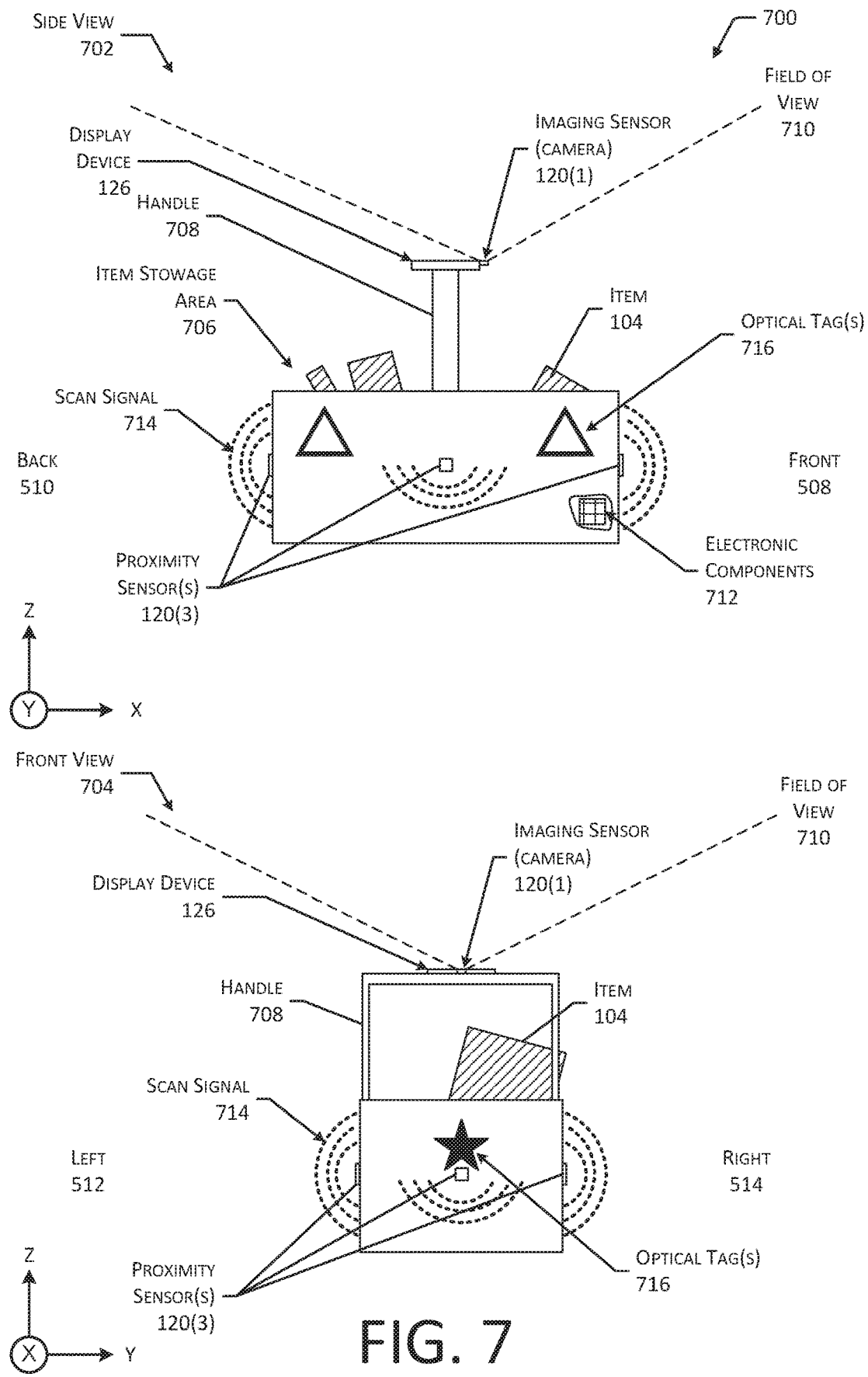
FIG. 7 illustrates front and side views of the tote, according to some implementations.

FIG. 7 illustrates views 700 of the tote 118, according to some implementations. A side view 702 and a front view 704 of the tote 118 are depicted. In this illustration, the tote 118 is configured to be carried or held by the user 116 while being moved within the facility 102.

The tote 118 comprises an item stowage area 706. The item stowage area 706 may be made of a substantially rigid material sufficient to carry one or more items 104. For example, the item stowage area 706 may comprise metal, plastic, ceramic, or composite materials. The item stowage area 706 may include platforms, receptacles, cubbyholes, baskets, shelves, wells, or other features or apparatus to maintain one or more items 104 with the tote 118. The item stowage area 706 is configured to contain one or more items 104 as loaded by the user 116, or another agency such as a robot or automated equipment.

A handle 708 is coupled to the item stowage area 706, and is configured to support the item stowage area 706 and the items 104 which may be placed therein. The handle 708 is further configured to be engaged by the user 116. For example, the handle 708 may be configured to be gripped by hand or placed in the crook of the user's 116 elbow.

In some implementations, one or more weight sensors 120(4) may be configured to acquire weight data indicative of a weight of the item stowage area 706. For example, a strain gauge may be incorporated into the handle 708.

The tote 118 may include one or more display devices 126. In the implementation depicted here, the display device 126 is mounted on the handle 708. In other implementations, the display device 126 may be mounted on or at other portions of the tote 118, such as on the item stowage area 706.

The tote 118 may also include one or more imaging sensors 120(1). For example, as illustrated here, a camera is attached to the handle 708. The imaging sensor 120(1) has a field of view 710. In some implementations, the field of view 710 may be a wide-angle, greater than 100°. For example, the imaging sensor 120(1) may use a full frame fisheye lens to acquire an image across a 170° angle. The imaging sensor 120(1) onboard the tote 118 may be configured to acquire an image including at least a portion of the user 116 while the user 116 is moving the tote 118. A process for determining the tote placement data 330 based on the image from the imaging sensor 120(1) which is onboard the tote 118 is described below in more detail with regard to FIG. 13.

The tote 118 may include one or more electronic components 712, such as those described above with regard to FIG. 4 which may include the sensors 120, the display devices 126, the one or more processors 402 or other devices configured to control operation of the display devices 126, and so forth. Upon generation or receipt of the display orientation data 124, the tote 118 may present the user interface 128 and a particular orientation.

As described above with regard to FIG. 4, the electronic components 712 of the tote 118 may include one or more proximity sensors 120(3). As depicted in this illustration, proximity sensors 120(3) are arranged on the four sides of the item stowage area 706. Each of the proximity sensors 120(3) may be configured with a different field of view. In some implementations, additional or fewer proximity sensors 120(3) may be arranged on the tote 118. For example in some implementations, a single proximity sensor 120(3) may be arranged on a left 512 side of the tote 118. Detection of an object by the proximity sensor 120(3) may indicate that the user 116 is to the left 512 of the tote 118, while non-detection may indicate the user 118 is to the right 514 of the tote 118.

The proximity sensors 120(3) may be active in that they emit a scan signal 714 or field with which a proximate object will interact with. Interaction with the scan signal 714 may just be used to determine the proximity of the object, such as a portion of the body of the user 116. In other implementations the proximity sensors 120(3) may be passive in that they detect the presence of the object, such as by receiving infrared radiation emitted by the object.

The tote 118 may also include one or more optical tags 716. The optical tags 716 may include machine-readable optical codes, symbols, or other markings. The optical tags 716 may be affixed to, printed on, embossed within, or otherwise presented on one or more sides of the tote 118. For example, in this illustration, the optical tags 716 comprise different shapes to distinguish or identify particular sides of the tote 118. The inventory management system 122 may be configured to identify and recognize these optical tags 716 in the image data 604. Based on this information, the inventory management module 316 may determine a position, an orientation, or both of the tote 118.

Figure 8:
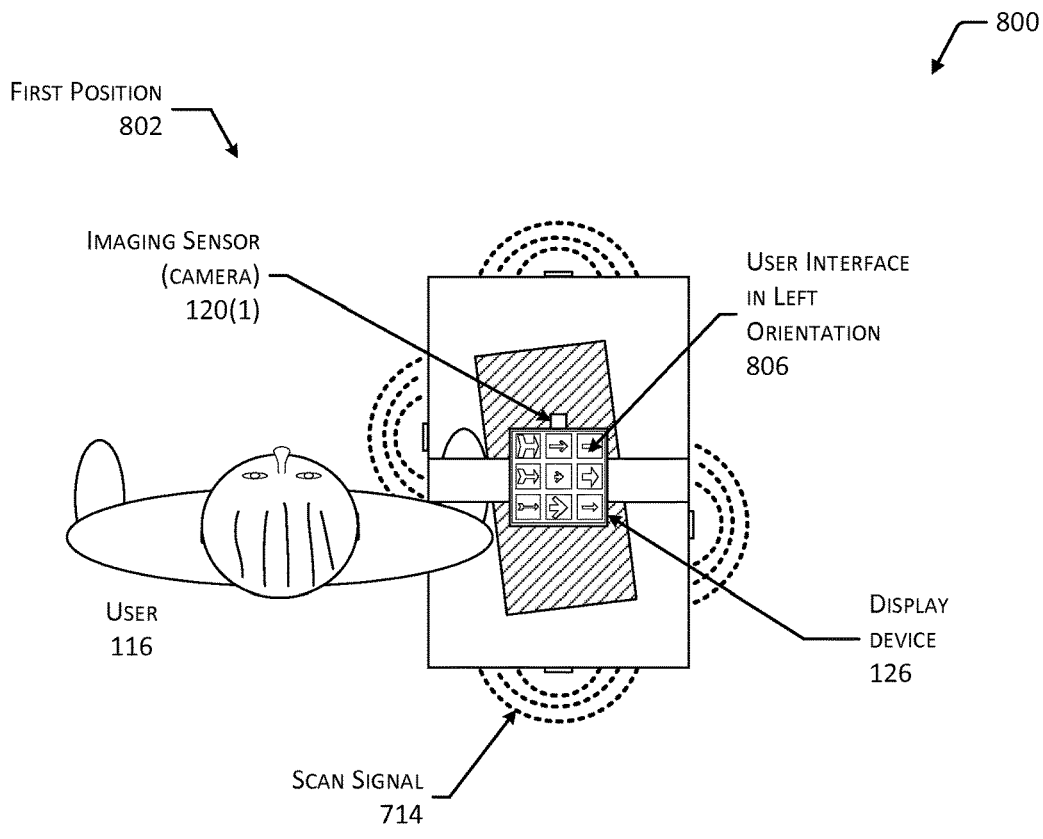
FIG. 8 illustrates overhead views of the tote of FIG. 7 including the user interface in different orientations, according to some implementations.
Figure 8:
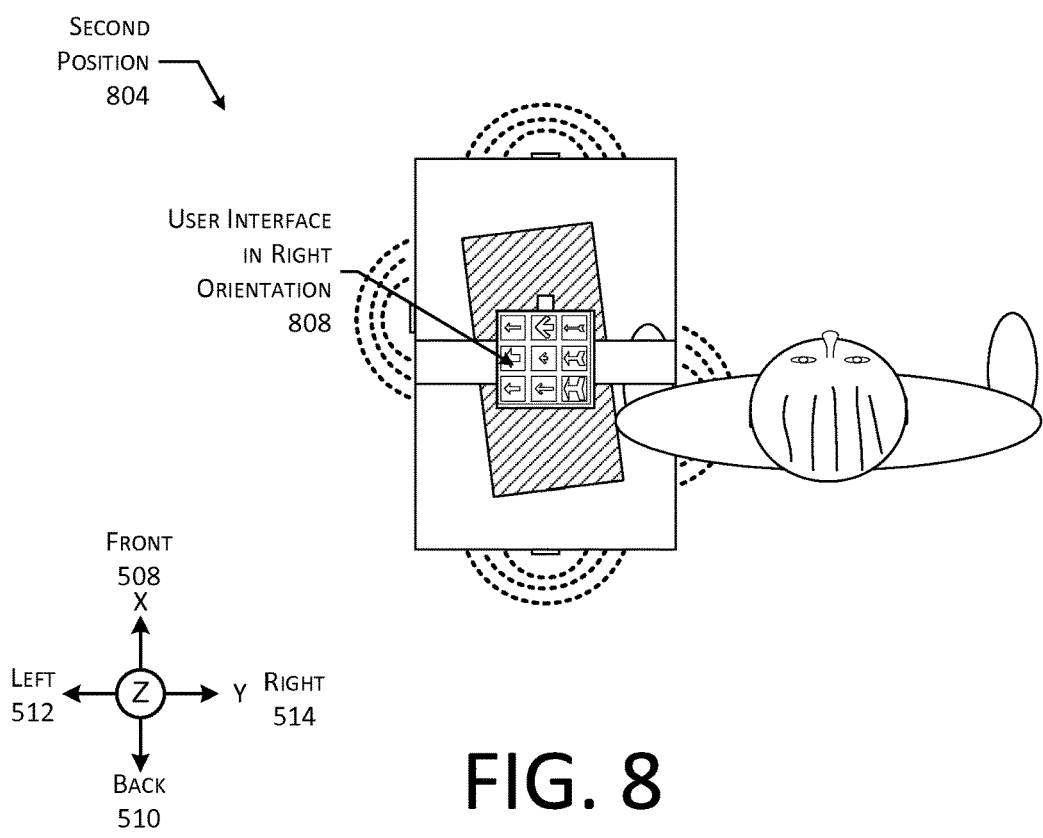

FIG. 8 illustrates overhead views 800 of the tote of FIG. 7 including the user interface 128 in different orientations. These views include the user 116 in a first position 802 to the left 512 of the tote 118 and a second position 804 to the right 514 of the tote 118.

In the first position 802, the tote placement is such that the user 116 is positioned to the left 512 of the tote 118. The display orientation data 124 is based at least in part on the tote placement, and as a result the display device 126 presents the user interface 128 with a left orientation 806.

In the second position 804, the tote placement is such that the user 116 is positioned to the right 514 of the tote 118. In the second position 804, the display orientation data 124 is based at least in part on the tote placement, and as a result the display device 126 now presents the user interface 128 with a right orientation 808.

As a result of the display orientation data 124, and a corresponding adjustment of the orientation of the user interface 128, the user 116 is presented with information on the display device 126 in an orientation which is readily readable. This may improve the users 116 comprehension, which may improve overall accuracy of the facility 102, and may also improve the overall user experience.

Figure 9:
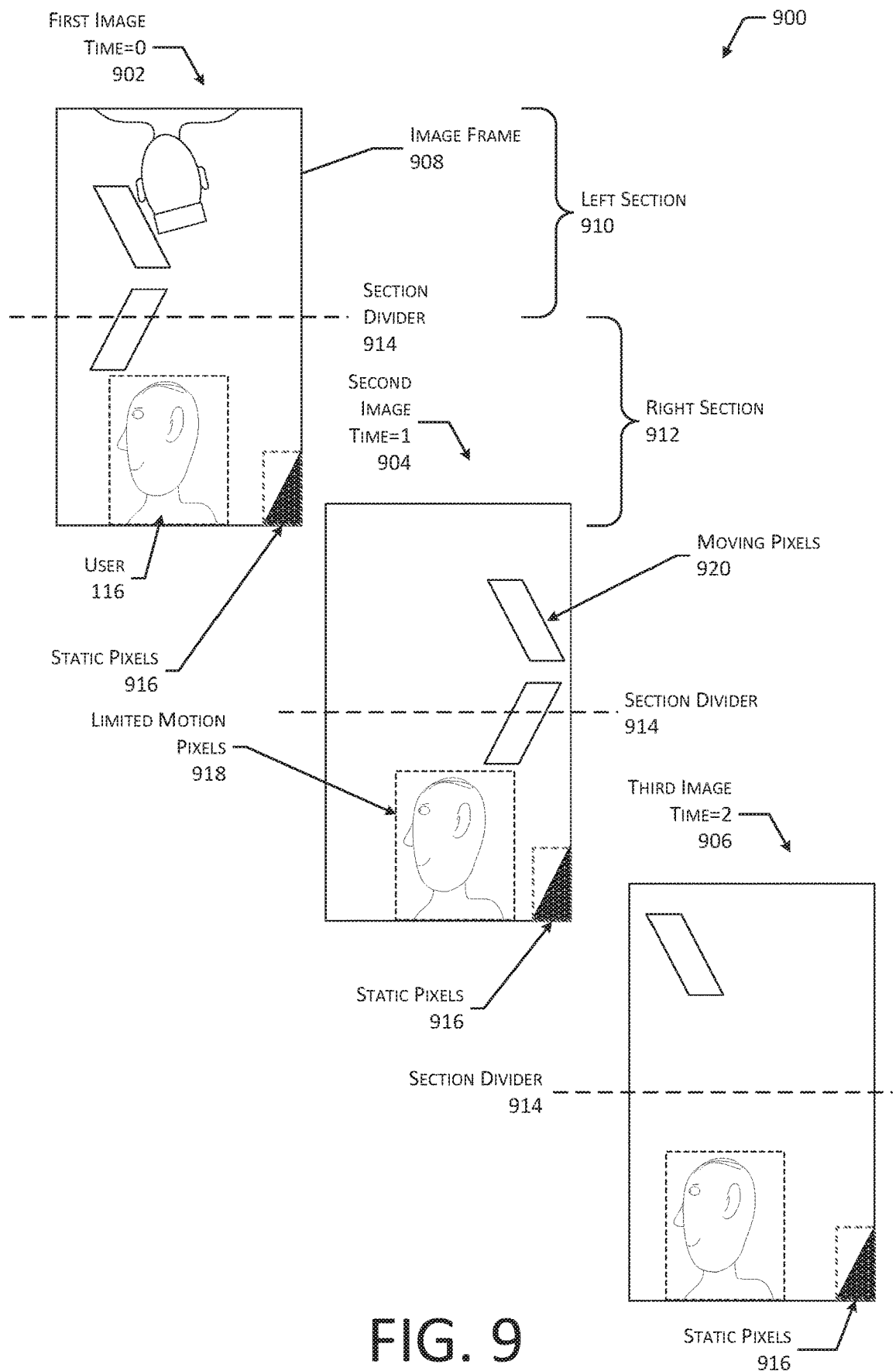
FIG. 9 illustrates a determination of relative position between the tote and the user based on images acquired by a camera onboard the tote, according to some implementations.

FIG. 9 illustrates a series of images 900 acquired by a camera onboard the tote 118, from which a determination of relative position between the tote 118 and the user 116 may be made. This determination may be used to generate tote placement data 330, which in turn may be used to determine display orientation data 124.

This illustration depicts a first image 902 at time=0, a second image 904 at time=1, and a third image 906 at time=2. These images may be acquired by an imaging sensor 120(1) which is onboard the tote 118. For example, the imaging sensor 120(1) may be mounted as depicted in FIG. 7.

An image frame 908 is depicted for each image. The image frame 908 includes the pixels associated with the image data of an image captured within the field of view 710 of the imaging sensor 120(1).

The image frame 908 may be divided into one or more sections or regions. In this illustration the image frame 908 is divided into a left section 910 and a right section 912. A section divider 914 is presented here as a dashed line to delineate between the sections. In some implementations more or fewer sections may be designated. In this illustration, the left section 910 corresponds to a portion of the field of view 710 to the left 512 of the tote 118. Similarly, the right section 912 corresponds to a portion of the field of view 710 to the right 514 of the tote 118. Thus, as the user 116 holds the tote 118 to the left 512 of their body, a portion of their body appears within the right section 912.

While the system is in operation, the imaging sensor 120(1) acquires the three images 902 through 906. Within the image frame 908 of each of the images may be one or more static pixels 916. Static pixels 916 are pixels which exhibit changes below a threshold value between successive images. For example, the static pixels 916 illustrated here include a portion of the handle 708 (to which the imaging sensor 120(1) is affixed) which appears in the field of view 710 to remain relatively fixed across the successive images. The threshold value may be based at least in part on one or more of apparent motion, changes in hue, changes in saturation, or changes in brightness. For example, the static pixels 916 may be designated as pixels which have no apparent motion between three image frames 908.

Limited motion pixels 918 are also illustrated. The limited motion pixels 918 include pictures which exhibit changes within a threshold range between successive images. The threshold range may be based at least in part on one or more of apparent motion, changes in hue, changes in saturation, or changes in brightness. For example, one or more pixels which have an apparent motion of less than 30 pixels may be designated as limited motion pixels 918. The limited motion pixels 918 may be indicative of at least a portion of the user 116 during use of the tote 118. For example from the point of view of the imaging device 120(1) onboard the tote 118, a portion of the user 116 which is present in the field of view 710 remains within the field of view 710. The portion of the user 116 in the image frame 908 may move slightly, such as due to a swinging of the user's 116 arm which holds the tote 118, but otherwise remains within the image frame 908.

In comparison, moving pixels 920 are those pixels which exhibit changes above a threshold value between successive images. The threshold value may be based at least in part on one or more of apparent motion, changes in hue, changes in saturation, or changes in brightness. For example, pixels associated with items such as overhead lights, other users 116 walking past, and so forth will enter and exit the image frame 908 across successive images as the tote 118 moves within the facility 102.

As illustrated here, in the first image 902, the user 116 is present in the right section 912. Also present in the right section 912 are some static pixels 916, such as may result from portion of the handle 708 which appears within the field of view 710, for an item 104 in the item stowage area 706 which appears within the field of view 710, and so forth.

Across the three images 904-906, the static pixels 916 remain unchanged. Because they are unchanging across several image frames 908, the static pixels 916 may be discounted from consideration as being potentially a portion of the user 116.

In comparison, the image of the user 116 exhibits some slight motion, but remains generally within the same area of the image frame 908. Given the slight motion within a threshold range, the group of limited motion pixels 918 may be determined to be the user 116. By analyzing the relative motion of the pixels, the determination of the user position may be determined without the need for object recognition or other computationally intensive techniques.

The various thresholds may be determined manually, such as by a software developer, or automatically. For example, one or more machine learning techniques may be used to set the range of values which define the limited motion pixels 918.

In some implementations optical tags or other visible features may be emplaced on, or incorporated into, the ceiling of the facility 102, on inventory locations 114, and so forth. The optical tags may be identified within the image data. Once identified, portions of the image frame 908 which include the ceiling, inventory locations 114, and so forth may be removed from consideration in the determination of the user position. For example, portions of the image which include the optical tags associated with the ceiling may be disregarded when determining the limited motion pixels 918.

Figure 10:
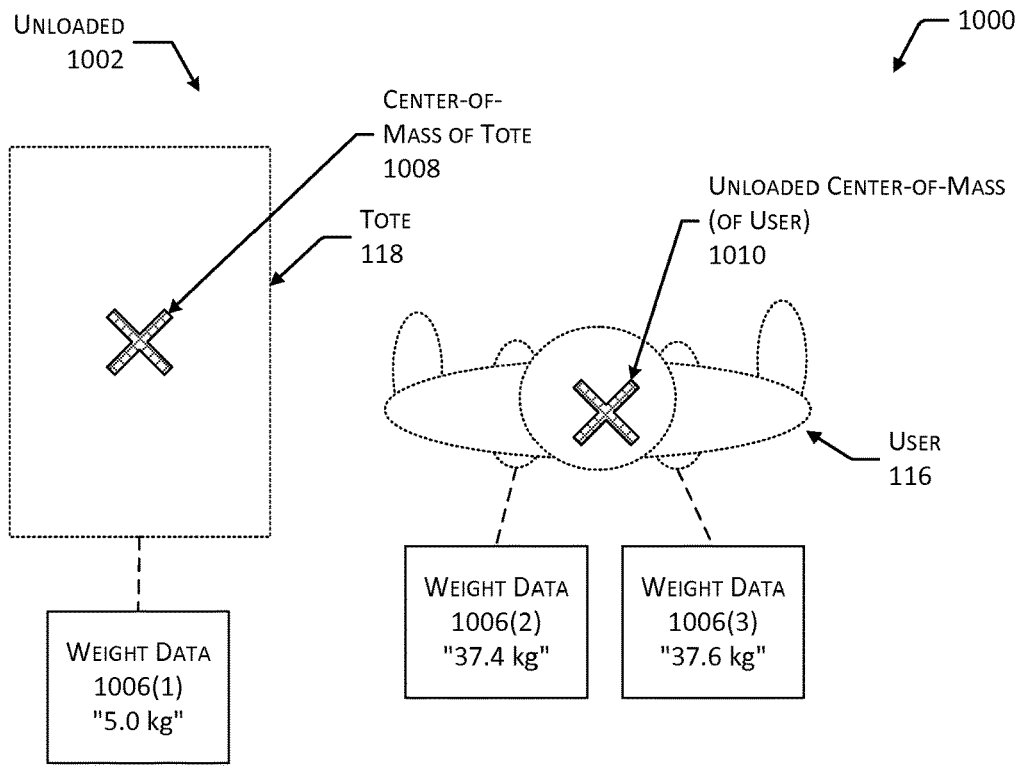
FIG. 10 illustrates a determination of relative position between the tote and the user based on weight of the user, according to some implementations.
Figure 10:
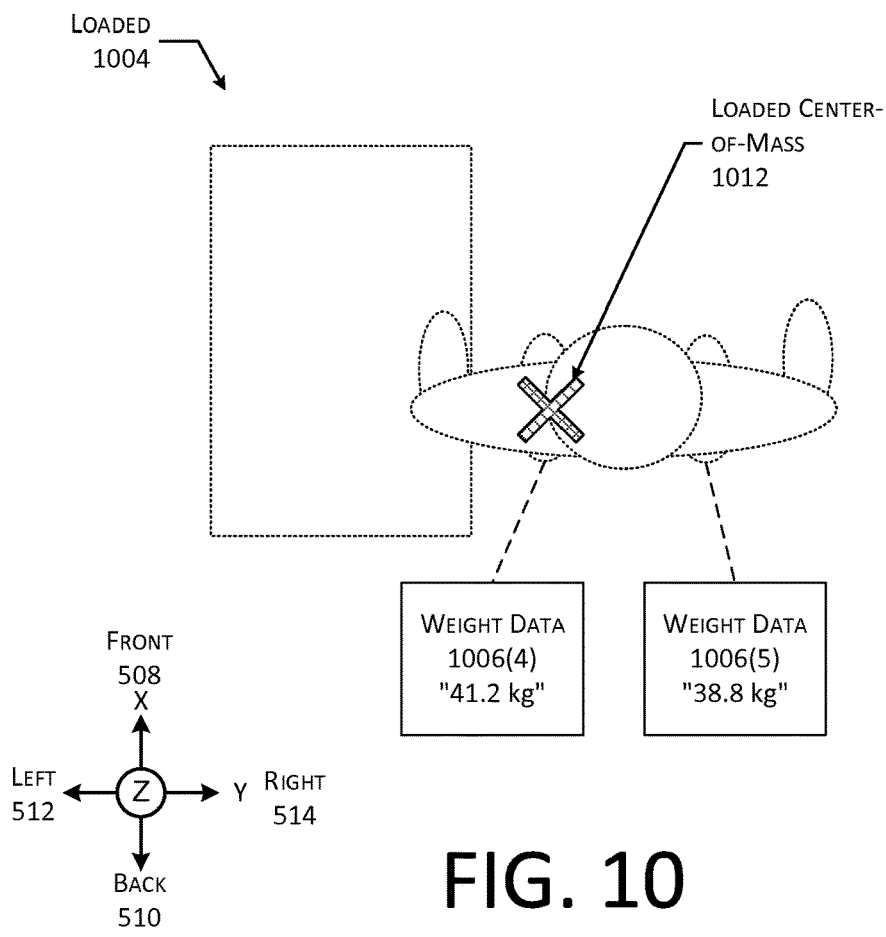

FIG. 10 illustrates an overhead view 1000 of a determination of relative position between the tote 118 and the user 116, based on weight, according to some implementations. An unloaded configuration 1002 and a loaded configuration 1004 are illustrated. In the unloaded configuration 1002, the user 116 is standing with both feet on the floor of the facility 102 and is not supporting the tote 118. For example, the tote 118 may be resting on the floor. Also depicted is weight data 1006. For example, the weight data 1006(1) of the tote 118 is resting on the floor is a value of 5.0 kg. A center-of-mass of the tote 1008 may be determined or assumed by the inventory management system 122. For example, multiple weight sensors 120(4) within the tote 118 or the floor of the facility 102 may generate weight data 1006 for multiple points enabling calculation of the center-of-mass of the tote 1008. In this illustration, the center of mass of the tote 1008 is depicted as the geometric center of the tote 118. However, variations in loading items 104 or other objects into the tote 118 may result a different center of mass of the tote 1008.

An unloaded center-of-mass of the user 1010 may be determined from the weight data 1006(2) and 1006(3) associated with the weight of the users 116 left foot and right foot, respectively. For example, the weight data 1006(2) for the left foot is 37.4 kg, while the weight data 1006(3) for the right foot is 37.6 kg. In this example, the unloaded center-of-mass of the user 1010 is just slightly to the right of the user's 116 geometric center.

In the loaded configuration 1004, the user 116 is now holding the tote 118 with a left arm. The weight data 1006(1) which is indicative of the weight of the tote 118 on the floor of the facility 102 has gone to zero. Weight data 1006(4) for the left foot in the loaded configuration 1004 is now 41.2 kg, while weight data 1006(5) for the right foot is now 38.8 kg. As a result of the change in this weight distribution the loaded center-of-mass 1012 of the combined user 116 and tote 118 has shifted relative to the unloaded center of mass 1010. The shift has displaced the loaded center-of-mass towards the side of the user 116 which is supporting the weight of the tote 118, such as the left 512 side in this illustration.

In some implementations, the center of mass of the user while unloaded 1010 or loaded 1012 may be determined at different points in the user's 116 gate or stride. For example, the loaded center-of-mass 1012 may be determined as the user 116 begins to walk, or as the user 116 comes to a halt.

The inventory management system 122 may use the determined relative position of the tote 118 with respect to the user 116 to generate the display orientation data 124. For example, based at least in part on the position of the loaded center-of-mass 1012 being to the left of the unloaded center of mass of the user 1010, the inventory management system 122 may determine that the tote 118 is to the left 512 of the user 116. In some implementations orientation information, such as obtained from the imaging sensors 120(1), the magnetometer 120(12) onboard the tote 118, and so forth may be used to disambiguate which direction the tote 118, the user 116, or both are facing.

In another implementation, additional information such as foot placement and orientation may also be used to determine the relative position of the tote 118 with respect to the user 116. For example, rotation of a particular foot with respect to another foot may be indicative of the relative position.

Illustrative Processes

Figure 11:
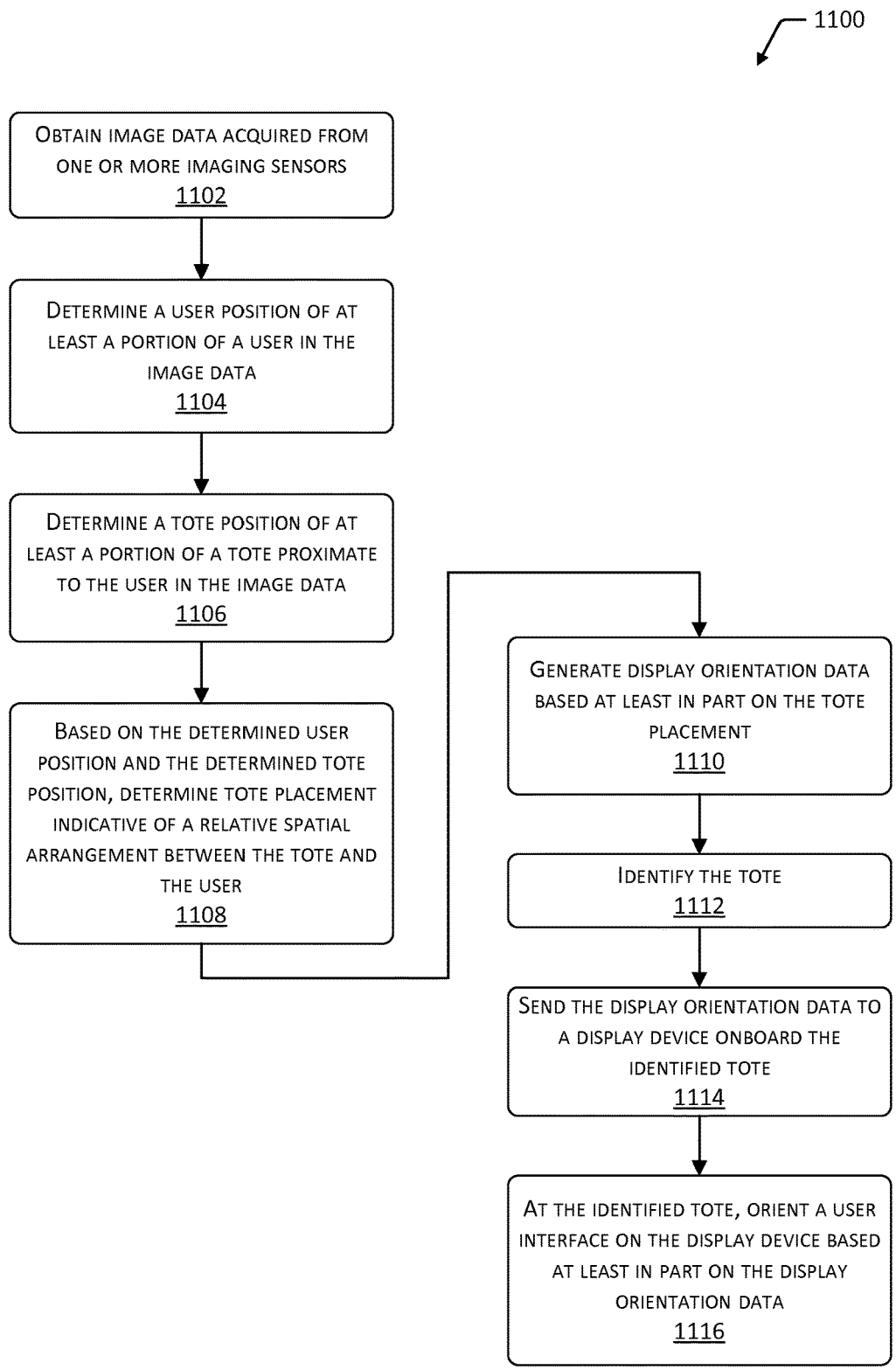
FIG. 11 depicts a flow diagram of a process for determining tote placement based on imaging sensors external to the tote, according to some implementations.

FIG. 11 depicts a flow diagram 1100 of a process for determining tote placement based on imaging sensors 120(1) which are external to the tote 118, according to some implementations. The process may be performed at least in part by the inventory management module 316.

As described above with regard to FIG. 6, in some implementations sensors 120 such as the imaging sensors 120(1) may be positioned overhead such that they look down or at a downward angle to view the user 116 and the tote 118 in the facility 102 during operation. The image data 604 acquired from the imaging sensors 120(1) may be stored in the data store 320.

Block 1102 accesses the image data 604. For example, one or more images may be obtained from the data store 320.

Block 1104 determines user position data 326 of at least a portion of a user 116 in the image data 604. For example, the object recognition software may be used to determine the presence of at least a portion of the user 116, such as their face. In some implementations, the particular user 116 may be identified. In some implementations, facial recognition software may be used to determine the identity of the user 116.

The inventory management module 316 may determine the user position data 326 by recognizing the user 116 in the image. Using a technique such as stadiametric range finding, based on an apparent size of the user 116 in the image, a distance from the imaging sensor 120(1) to the user 116 may be determined. Based on an apparent position of the user 116 within the image, the module may determine a first bearing to the tote 118 relative to the imaging sensor 120(1). For example, if the image of the user 116 is in a center of the image, the user 116 is located in a straight line extending along an optical axis of the imaging sensor 120(1). By using a known position of the imaging sensor 120(1) in the facility 102 (as stored in the physical layout data 322), the distance, and the bearing, the user position data 326 may be determined. In some implementations the user position data 326 may be expressed as a pair of coordinates within in a two-dimensional plane. The two-dimensional plane may be parallel to the floor of the facility 102.

Block 1106 determines tote position data 328 of at least a portion of the tote 118. The tote position data 328 is indicative of a position of a tote 118 which is proximate to the user 116 in the image data 604. For example, one or more of the optical tags 716 may be recognized and used to determine one or more of the presence or the position of the tote 118 in the image.

The inventory management module 316 may determine the tote position data 328 by recognizing the tote 118 in the image. Using a technique such as stadiametric rangefinding, based on an apparent size of the tote 118 in the image, a distance from the imaging sensor 120(1) to the tote 118 may be determined. Based on an apparent position of the tote 118 within the image, the module may determine a first bearing to the tote 118 relative to the imaging sensor 120(1). For example, if the image of the tote 118 is to the left of center of the image, the tote 118 is located to the left of a straight line extending along an optical axis of the imaging sensor 120(1). By using a known position of the imaging sensor 120(1) in the facility 102 (as stored in the physical layout data 322), the distance, and the bearing, the tote position data 328 may be determined. In some implementations the tote position data 328 may be expressed as a pair of coordinates within in the two-dimensional plane.

Based at least in part on the determined user position data 326 and the determined tote position data 328, block 1108 determines tote placement data 330 indicative of a relative spatial arrangement between the tote 118 and the user 116, or vice versa.

Block 1110 generates display orientation data 124 based at least in part on the tote placement data 330. For example, the orientation lookup data 332 may indicate a predefined display orientation given the tote placement.

Block 1112 identifies the tote 118 in the image data 604. For example, one or more of the optical tags 716 may be recognized and provide information indicative of a serial number of the tote 118. Continuing the example, the optical tags 716 may include a one or two dimensional barcode encoding the serial number, a network address, media access control address, or other identifier of the tote 118. In other implementations the tote 118 may be identified by way of an RF signal 208 from an RF tag 206, manual entry, weight, from data indicating the tote 118 is assigned to a particular location of the facility 102, and so forth.

Block 1114 sends the display orientation data 124 to the computing device onboard the identified tote 118 which is coupled to a display device 126. For example, the server 204 may use the communication interface 308 to send the display orientation data 124 to the identified tote 118.

At the identified tote 118 which has received the display orientation data 124, block 1116 orients at least a portion of the user interface 128 on the display device 126 based at least in part on the display orientation data 124. For example, the user interface 128 may be rotated to the second orientation 522.

Figure 12:
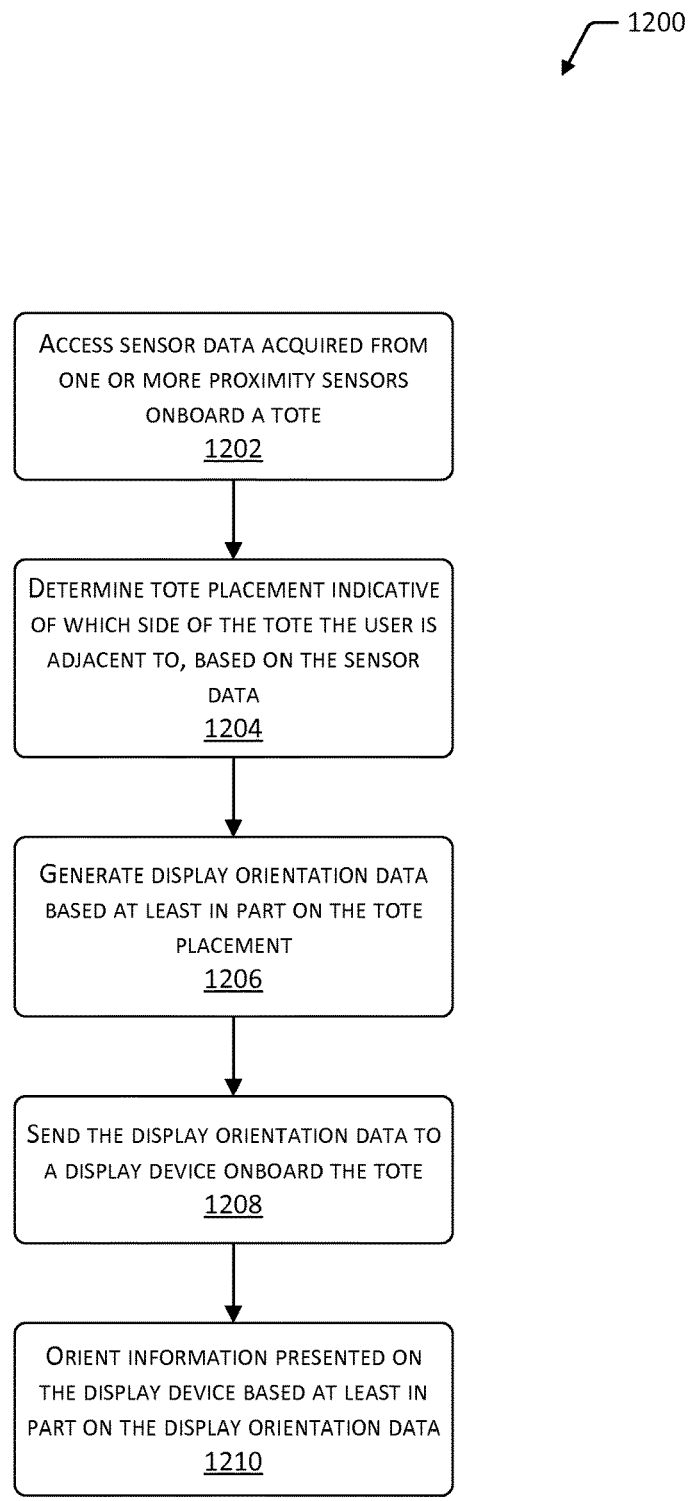
FIG. 12 depicts a flow diagram of a process for determining tote placement based on proximity sensors onboard the tote, according to some implementations.

FIG. 12 depicts a flow diagram 1200 of a process for determining tote placement data 330 based on proximity sensors 120(3) onboard the tote 118, according to some implementations. The process may be implemented at least in part by the inventory management module 316, the display module 418, or both.

Block 1202 accesses sensor data 324 acquired from one or more of the proximity sensors 120(3) onboard the tote 118. For example, sensor data 324 may be retrieved from the data store 320, the data store 422, or both.

Block 1204 determines tote placement data 330. As described above, the tote placement data 330 provides information indicative of which side of the tote 118 the user 116 is adjacent to, or vice versa.

This determination may include detecting proximity of an object at one of the one or more proximity sensors 120(3). A threshold duration of the indication of proximity of the object may be designated. This threshold may be used to prevent false indications of object proximity. For example, the threshold duration may indicate that proximity detections exceeding two seconds are deemed to indicate presence of an object. The tote placement data 330 may be determined based at least in part on the detection exceeding the threshold duration and position of the one or more proximity sensors 120(3) which detected the object. Continuing the example, data from the proximity sensor 120(3) on the left 512 for more than two seconds may result in tote placement data 330 indicating the user 116 is to the left 512 of the tote 118.

Block 1206 generates display orientation data 124 based at least in part on the tote placement data 330. For example, the orientation lookup data 332 may indicate a predefined display orientation given the tote placement.

Block 1208 sends the display orientation data 124 to the display device 126 onboard the tote 118. For example, the server 204 may use the communication interface 308 to send the display orientation data 124 to the identified tote 118. In other implementations, such as where the tote placement data 330, the display orientation data 124, or other information is generated onboard the tote 118, the tote 118 may send that information to the server 204.

Block 1210 orients at least a portion of the user interface 128 on the display device 126 of the tote based at least in part on the display orientation data 124. For example, the user interface 128 may be rotated to the second orientation 522. In some implementations, the imagery associated with the user interface 128 may be reoriented before being sent to the tote 118.

Figure 13:
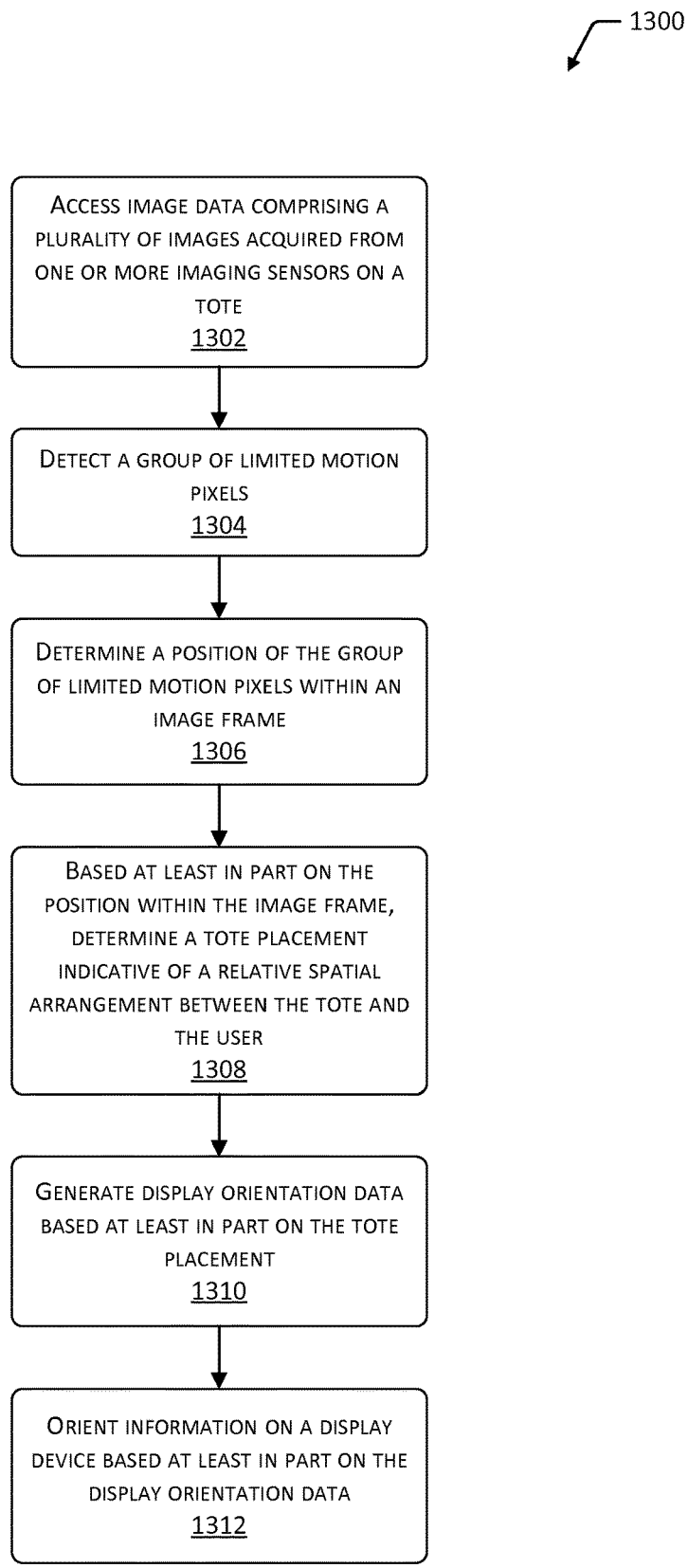
FIG. 13 depicts a flow diagram of a process for determining tote placement based on imaging sensors onboard the tote, according to some implementations.

FIG. 13 depicts a flow diagram 1300 of a process for determining tote placement based on imaging sensors onboard the tote, according to some implementations. The process may be implemented at least in part by the inventory management module 316, the display module 418, or both.

Block 1302 accesses sensor data 324 including image data 604. The image data 604 comprises a plurality of successive images acquired at subsequent times from one or more imaging sensors 120(1) on the tote 118. For example, the image data 604 may be stored in the data store 320, the data store 422, or both.

Block 1304 detects a group of limited motion pixels 918 having apparent motion within a threshold range between the plurality of successive images. The threshold range may extend from a first non-zero value to a second non-zero value greater than the first non-zero value. For example, the threshold range may be configured to exclude static pixels 916 and the moving pixels 920.

Block 1306 determines a position of the group of limited motion pixels 918 within an image frame 908. For example, a centroid of the group of limited motion pixels 918 may be within the right section 912.

Block 1308, based at least in part on the position within the image frame 908, determines the tote placement data 330. Continuing the example, given a centroid of the group of limited motion pixels 918 being within the right section 912, the tote placement data 330 may indicate that the tote 118 is to the right 514 of the user 116.

Block 1310 generates display orientation data 124 based at least in part on the tote placement data 330. For example, the orientation lookup data 332 may indicate a predefined display orientation given the tote placement.

Block 1312 orients at least a portion of the user interface 128 on the display device 126 of the tote 118 based at least in part on the display orientation data 124. For example, the user interface 128 may be rotated to the third orientation 524. In some implementations, the imagery associated with the user interface 128 may be reoriented before being sent to the tote 118.

Figure 14:
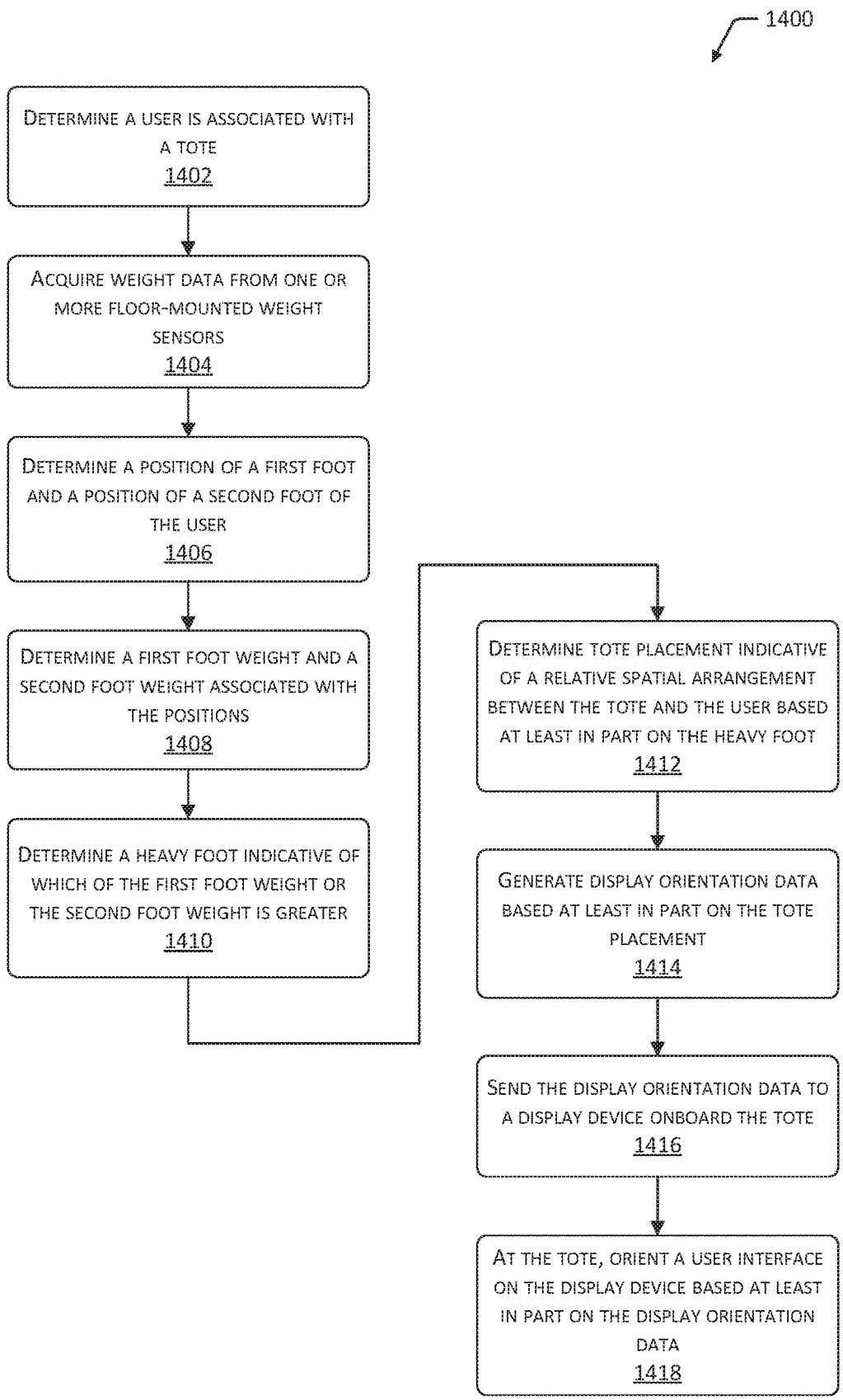
FIG. 14 depicts a flow diagram of a process for determining tote placement based on weight sensors, according to some implementations.

FIG. 14 depicts a flow diagram 1400 of a process for determining tote placement based on weight sensors, according to some implementations. The process may be performed at least in part by the inventory management module 316.

Block 1402 determines the user 116 is associated with the tote 118. As described above, the tote 118 and the user 116 may each have an RF tag 206. In one implementation, the determination that the user 116 is associated with the tote 118 may comprise receiving information from the RFID receiver 120(9) that the RF tag 206(1) associated with the tote 118 is within a threshold distance of the RF tag 206(2) associated with the user 116. In another implementation, the determination that the user 116 is associated with the tote 118 may be based at least in part on image data acquired by one or more imaging sensors 120(1) within the facility 102.

Block 1404 acquires weight data 1006 for each foot of the user 116 from the weight sensor 120(4). The weight data 1006 may be acquired while the user 116 is not moving, such as while standing still, or at a particular point in a stride of the user 116. For example, the particular points may include one or more of: initial contact of foot to the weight sensor 120(4), maximum applied force to the weight sensor 120(4), or departure contact of foot from the weight sensor 120(4).

Block 1406 determines a position of a first foot and a position of a second foot of the user 116. For example, weight data 1006 exceeding the minimum threshold value such as 15 kg in an area in the facility 102 at which the user 116 has been detected may be designated as the respective foot positions. In some implementations, orientation data of the user 116 may be used to disambiguate the left foot of the user 116 from the right foot. For example, the imaging sensors 120(1) may acquire an image of the user 116 from a first direction and detect the users 116 face. By knowing which side the user's face is presented on, the left and right feet of the user 116 may be determined.

Block 1408 determines a first foot weight and a second foot weight associated with the position of the first foot and the position of the second foot. For example, the weight sensors 120(4) in the floor of the facility 102 may provide the weight data 1006.

Block 1410 determines a heavy foot indicative of which of the first foot weight or a second foot weight is greater. Referring to the example of FIG. 10, the heavy foot in the loaded configuration 1004 is the user's 116 left foot.

As described above with regard to FIG. 10, in some implementations, the process may be configured to determine an unloaded center of mass of the user 1010 based on the weight data 1006 before acquisition by the user 116 of the tote 118. A subsequent loaded center of mass of the user 1012 may then be determined after acquisition by the user 116 of the tote 118. The determination of the heavy foot may then comprise a comparison of the unloaded center of mass 1010 with the loaded center of mass 1012, such that the foot closest to the loaded center of mass is designated as the heavy foot.

Block 1412 determines tote placement data 330 indicative of a relative spatial arrangement between the tote 118 and the user 116, based at least in part on the heavy foot. For example, the orientation lookup data 332 may comprise a heuristic which indicates that the heavy foot corresponds to the side of the user 116 holding the tote 118.

Block 1414 generates display orientation data 124 based at least in part on the tote placement data 330. Continuing the example, the display orientation data 124 may indicate that the user interface 128 is to be rotated 90°.

Block 1416 sends the display orientation data 124 to the display device 126 onboard the tote 118. For example, the inventory management module 316 may use the communication interfaces 308 to send the display orientation data 124 to the computing device onboard the tote 118 which is coupled to a display device 126.

At the tote, block 1418 orients a user interface on the display device 126 based at least in part on the display orientation data 124. Continuing the example, the user interface 128 is presented on the display device 126 rotated 90° from the default orientation.

The various processes described above may be used in various combinations with one another. For example, the display orientation data 124 may be determined based on one or more of the image data from the overhead imaging sensors 120(1), imaging sensors 120(1) onboard the tote 118, the proximity sensors 120(3), the weight sensors 120(4), and so forth.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
 a communication interface configured to communicatively couple to a computing device onboard a tote;
 a camera configured to acquire an image of a user holding the tote, wherein the camera is external to the tote;
 a memory storing computer-executable instructions; and
 a hardware processor in communication with the communication interface, the camera, and the memory, wherein the hardware processor is configured to execute the computer- executable instructions to:
  obtain image data from the camera that is external to the tote;
  determine a user position indicative of the user in the image data;
  determine a tote position indicative of the tote in the image data;
  based at least in part on the user position and the tote position, determine tote placement indicative of a relative spatial arrangement between the tote and the user;
  generate first display orientation data based at least in part on the tote placement;
  identify the tote in the image data;
  send, using the communication interface, the first display orientation data to the computing device onboard the tote, wherein the computing device is configured to orient a user interface on a display device based at least in part on the first display orientation data;
  generate second display orientation data, in response to detecting a change in the relative spatial arrangement between the tote and the user; and
  send, using the communication interface, the second display orientation data to the computing device onboard the tote, wherein the computing device is configured to change orientation of at least a portion of the user interface on the display device based at least in part on the second display orientation data.

2. The system of claim 1, wherein the determination of the user position comprises computer-executable instructions to:
 recognize the user in the image data;
 based on an apparent size of the user in the image data, determine a first distance from the camera to the user;
 based on an apparent position of the user within the image data, determine a first bearing to the tote relative to the camera;
 determine the user position in a two-dimensional plane based on the first distance and the first bearing; and
 further wherein the determination of the tote position comprises computer-executable instructions to:
 recognize the tote in the image data;
 based on an apparent size of the tote in the image data, determine a second distance from the camera to the tote;
 based on an apparent position of the tote within the image data, determine a second bearing to the tote relative to the camera; and
 determine the tote position in the two-dimensional plane based on the second distance and the second bearing.

3. The system of claim 1, further comprising:
 a floor supporting the tote and the user;
 a support structure supporting the camera above the floor; and
 wherein:
  the image data comprises a portion of the floor; and
  the user position and the tote position are expressed as coordinates in a two- dimensional plane parallel to the floor.

4. The system of claim 1, the tote comprising:
 an item stowage area having a front side, a back side, a left side, and a right side;
 a handle connected to or integral with the item stowage area;
 one or more optical tags configured to identify the tote; and
 further wherein the hardware processor is configured to execute the computer- executable instructions to:
  recognize the one or more optical tags in the image data; and
  wherein the identification of the tote is based on the one or more optical tags recognized in the image data.

5. The system of claim 1, wherein:
 the determination of the user position comprises computer-executable instructions to recognize the user as depicted in the image data using a neural network;
 the determination of the tote position comprises computer-executable instructions to recognize the tote as depicted in the image data using the neural network;
 the user position is indicative of a first pair of coordinates within a two-dimensional plane;
 the tote position is indicative of a second pair of coordinates within the two-dimensional plane.

6. A method comprising:
 accessing sensor data acquired by one or more sensors, wherein:
  at least a portion of the one or more sensors are external to a tote, the one or more sensors comprise an imaging sensor, and the sensor data comprises an image;

determining, using the sensor data, tote placement indicative of a relative spatial arrangement between the tote and a user, wherein:

the determining the tote placement is based at least on:

determining a first apparent position in the image of a face of the user, and determining a second apparent position in the image of at least a portion of the tote, and the relative spatial arrangement between the tote and the user is based on the first apparent position and the second apparent position;

generating display orientation data based at least in part on the tote placement;

orienting a second image presented on a display device based at least in part on the display orientation data; and changing an orientation of at least a portion of the second image presented on the display device based at least in part on detecting a change in the relative spatial arrangement between the tote and the user.

7. The method of claim 6, further comprising:

receiving tote position data indicative of a tote position from a first set of the one or more sensors which are associated with the tote;

determining user position data based on input from a second set of the one or more sensors; and wherein the determining the tote placement is based on the tote position data and the user position data.

8. The method of claim 6, wherein:

the imaging sensor is mounted to the tote, the imaging sensor is configured to acquire a third image of at least a portion of the user as the tote is held by the user, the sensor data further comprises a plurality of successive images; and the determining the tote placement comprising:

detecting a group of limited motion pixels having apparent motion within a threshold range between the plurality of successive images;

determining a position of the group of limited motion pixels within an image frame; and based at least in part on the position of the group of limited motion pixels being within a first section or a second section, designating the tote placement.

9. The method of claim 6, further comprising: sending the display orientation data to a computing device of the tote, wherein the computing device is coupled to the display device.

10. The method of claim 6, further comprising:

establishing a wireless connection with an external computing device; and sending the display orientation data to the external computing device.

11. The method of claim 6, the second image comprising a user interface having a plurality of individual user interface elements, and further wherein the changing the orientation of the at least a portion of the second image presented on the display device comprises rotating at least a portion of the plurality of individual user interface elements for presentation on the display device.

12. A method comprising:

accessing sensor data acquired by one or more proximity sensors which are mounted to a tote and configured to determine proximity of an object to one or more sides of the tote;

determining tote placement indicative of a relative spatial arrangement between the tote and a user using the sensor data, the determining the tote placement comprising:

detecting the proximity of the object at one of the one or more proximity sensors, determining that the detection of the proximity of the object occurs for a period exceeding a threshold duration, and designating the tote placement;

generating display orientation data based at least in part on the tote placement; and orienting an image presented on a display device of the tote based at least in part on the display orientation data.

13. The method of claim 12, the image comprising a user interface having a plurality of individual user interface elements, and further wherein the orienting the image presented on the display device comprises rotating at least a portion of the plurality of individual user interface elements for presentation on the display device.

14. A system comprising:

a communication interface configured to communicatively couple to a computing device of a tote;

an imaging sensor;

a weight sensor configured to acquire a weight of each foot of a user;

a memory storing computer-executable instructions; and a hardware processor in communication with the communication interface, the imaging sensor, the weight sensor, and the memory, wherein the hardware processor is configured to execute the computer-executable instructions to:

determine the user is associated with the tote;

acquire weight data for the each foot of the user from the weight sensor;

determine a position of a first foot and a position of a second foot of the user;

determine a first foot weight and a second foot weight associated with the position of the first foot and the position of the second foot;

determine a heavy foot indicative of which of the first foot weight or the second foot weight is greater;

determine tote placement indicative of a relative spatial arrangement between the tote and the user, based at least in part on the heavy foot; and generate display orientation data based at least in part on the tote placement.

15. The system of claim 14, wherein the hardware processor is further configured to execute the computer-executable instructions to:

send, using the communication interface, the display orientation data to the computing device of the tote, wherein the computing device is configured to orient an image presented on a display device based at least in part on the display orientation data.

16. The system of claim 14, wherein the imaging sensor is configured to acquire an image of the user holding the tote; and wherein the hardware processor is further configured to execute the computer- executable instructions to:

acquire image data from the imaging sensor;

determine a user position indicative of the user in the image data;

determine a tote position indicative of the tote in the image data; and further wherein the determination of the tote placement uses the user position and the tote position.

17. The system of claim 14, wherein the tote comprises the imaging sensor in communication with the hardware processor, wherein the imaging sensor is configured to acquire a plurality of successive images of at least a portion of the user as the tote is held by the user; and
- wherein the hardware processor is further configured to execute the computer- executable instructions to:
  - detect a group of limited motion pixels having apparent motion within a threshold range between the plurality of successive images;
  - determine a position of the group of limited motion pixels within an image frame; and
  - wherein the determination of the tote placement is further based on the position of the group of limited motion pixels being within a predetermined section of the image frame.

18. The system of claim 14, further comprising a radio frequency identification (RFID) receiver in communication with the hardware processor, wherein the RFID receiver is configured to acquire information from one or more RFID tags; and
- wherein the determination that the user is associated with the tote comprises computer- executable instructions to:
  - receive information from the RFID receiver indicating an RFID tag is within a threshold distance of a second RFID tag associated with the user.

19. The system of claim 14, wherein the weight data is acquired at a particular point in a stride of the user, the particular point including one or more of:
- initial contact of a foot to the weight sensor,
- maximum applied force to the weight sensor, or
- departure contact of the foot from the weight sensor.

20. The system of claim 14, further comprising computer-executable instructions to:
- determine an unloaded center-of-mass of the user using the weight data before acquisition of the tote by the user;
- determine a loaded center-of-mass of the user using the weight data after the acquisition of the tote by the user; and
- further wherein the determination of the heavy foot comprises a comparison of the unloaded center-of-mass and the loaded center-of-mass.

21. A system comprising:
- a communication interface configured to communicatively couple to a computing device onboard a tote;
- one or more imaging sensors external to the tote configured to acquire images of a user holding the tote;
- a memory storing computer-executable instructions; and
- a hardware processor in communication with the communication interface, the one or more imaging sensors, and the memory, wherein the hardware processor is configured to execute the computer-executable instructions to:
  - obtain image data from the one or more imaging sensors external to the tote;
  - determine a user position indicative of at least a portion of the user in the image data;
  - determine a tote position indicative of at least a portion of the tote in the image data;
  - based on the user position and tote position, determine tote placement indicative of a relative spatial arrangement between the tote and the user;
  - generate display orientation data based at least in part on the tote placement; and
  - send, using the communication interface, the display orientation data to the computing device onboard the tote, wherein the computing device is configured to orient one or more graphical elements of a user interface presented on a display of the tote based on the display orientation data.

22. A method comprising:
- determining a user is associated with a tote;
- acquiring weight data associated with a first foot and a second foot of the user from one or more weight sensors;
- determining a first foot weight associated with the first foot of the user and a second foot weight associated with the second foot of the user;
- determining tote placement indicative of a relative spatial arrangement between the tote and the user, based at least in part on the first foot weight and the second foot weight; and
- generating display orientation data based at least in part on the tote placement.

* * * * *